US012783195B2

(12) United States Patent

Kim et al.

(10) Patent No.: US 12,783,195 B2
(45) Date of Patent: Nov. 3, 2026

(54) ELECTRONIC DEVICE AND METHOD FOR CONTROLLING DISPLAY OF AT LEAST ONE EXTERNAL OBJECT AMONG ONE OR MORE EXTERNAL OBJECTS

(71) Applicant: SAMSUNG ELECTRONICS CO., LTD., Gyeonggi-do (KR)

(72) Inventors: Mingyu Kim, Suwon-si (KR); Kwangtaek Woo, Suwon-si (KR); Jaeho Choi, Suwon-si (KR); Seonghun Kim, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/066,521

(22) Filed: Feb. 28, 2025

(65) Prior Publication Data

US 2025/0199742 A1 Jun. 19, 2025

Related U.S. Application Data

(63) Continuation of application No. 18/367,269, filed on Sep. 12, 2023, now Pat. No. 12,260,142, which is a (Continued)

(30) Foreign Application Priority Data

Sep. 2, 2022 (KR) ........................ 10-2022-0111743
Oct. 12, 2022 (KR) ........................ 10-2022-0130893

(51) Int. Cl.
*G06F 3/14* (2006.01)
*G02B 27/01* (2006.01)
(Continued)

(52) U.S. Cl.
CPC ........... *G06F 3/14* (2013.01); *G02B 27/0172* (2013.01); *G06F 3/04842* (2013.01); *G09G 5/377* (2013.01)

(58) Field of Classification Search
None
See application file for complete search history.

(56) References Cited

U.S. PATENT DOCUMENTS 9,851,788 B2 12/2017 Kim et al.
9,908,048 B2 3/2018 Osman et al.
(Continued)

FOREIGN PATENT DOCUMENTS

JP 2015-186210 A 10/2015
KR 10-2014-0137738 A 12/2014
(Continued)

OTHER PUBLICATIONS

International Search Report (PCT/ISA/210) issued on Dec. 20, 2023 by the International Searching Authority in International Application No. PCT/KR2023/012822.

(Continued)

*Primary Examiner* — Kenneth Bukowski
(74) *Attorney, Agent, or Firm* — Sughrue Mion, PLLC

(57) ABSTRACT

An electronic device according to an embodiment may comprise a camera, a display, a memory configured to store instructions, and at least one processor. The at least one processor may be configured to, when the instructions are executed, cause the electronic device to receive a first input for enabling a designated setting. The at least one processor may be configured to, when the instructions are executed, cause the electronic device to, in response to the input, recognize, from a screen being displayed through the display, a first area occupied by a first external object and a (Continued)

second area occupied by a second external object, based on an image being obtained via the camera.

14 Claims, 14 Drawing Sheets

Related U.S. Application Data continuation of application No. PCT/KR2023/012822, filed on Aug. 29, 2023.

(51) Int. Cl.

| | |
|---|---|
| ***G06F 3/04842*** | (2022.01) |
| ***G09G 5/377*** | (2006.01) |

(56) References Cited

U.S. PATENT DOCUMENTS

| | | | | |
|---|---|---|---|---|
| 9,912,880 | B2 | 3/2018 | Seo et al. | |
| 10,037,465 | B2 | 7/2018 | Goslin | |
| 10,181,178 | B2 * | 1/2019 | Cutler | H04N 7/142 |
| 10,282,865 | B2 | 5/2019 | Coglitore | |
| 10,474,233 | B2 | 11/2019 | Swaminathan et al. | |
| 10,665,019 | B2 | 5/2020 | Hildreth et al. | |
| 10,770,032 | B2 | 9/2020 | Yip et al. | |
| 10,924,676 | B2 | 2/2021 | Kraft | |
| 11,049,306 | B2 | 6/2021 | Anttila et al. | |
| 11,182,879 | B1 * | 11/2021 | Haslam | G06V 10/12 |
| 11,206,365 | B2 | 12/2021 | Wolfensparger et al. | |
| 11,243,734 | B2 | 2/2022 | Boissiere et al. | |
| 11,790,569 | B2 | 10/2023 | Nepveu et al. | |
| 11,842,449 | B2 | 12/2023 | Palangie et al. | |
| 11,880,911 | B2 | 1/2024 | Nepveu et al. | |
| 2014/0347540 | A1 | 11/2014 | Kang | |
| 2016/0112654 | A1 | 4/2016 | Seo | |
| 2017/0220863 | A1 | 8/2017 | Lection et al. | |
| 2017/0301067 | A1 * | 10/2017 | Cutler | H04N 23/63 |
| 2018/0095542 | A1 | 4/2018 | Mallinson | |
| 2018/0217680 | A1 | 8/2018 | Sudou | |
| 2019/0197990 | A1 | 6/2019 | Yip | |
| 2019/0227694 | A1 | 7/2019 | Shin et al. | |
| 2019/0279407 | A1 | 9/2019 | McHugh | |
| 2020/0225901 | A1 | 7/2020 | Boissiere | |
| 2021/0089117 | A1 | 3/2021 | Bodolec | |
| 2021/0217211 | A1 | 7/2021 | Stafford | |
| 2021/0263309 | A1 * | 8/2021 | Rivera Cintron | G06F 1/3218 |
| 2022/0253264 | A1 * | 8/2022 | Berliner | G06F 3/04812 |
| 2022/0256116 | A1 * | 8/2022 | Chu | H04N 23/661 |
| 2022/0317453 | A1 | 10/2022 | Jeong | |
| 2023/0045989 | A1 * | 2/2023 | Desai | G10L 15/083 |
| 2023/0306610 | A1 * | 9/2023 | Nicholson | G06T 5/50 |
| 2024/0045212 | A1 | 2/2024 | Kim | |
| 2024/0061547 | A1 | 2/2024 | Fleizach | |
| 2024/0103678 | A1 | 3/2024 | Dryer | |

FOREIGN PATENT DOCUMENTS

| | | | |
|---|---|---|---|
| KR | 10-2019-0089627 | A | 7/2019 |
| KR | 10-2048411 | B1 | 1/2020 |
| KR | 10-2218901 | B1 | 2/2021 |

OTHER PUBLICATIONS

Written Opinion (PCT/ISA/237) issued on Dec. 20, 2023 by the International Searching Authority in International Application No. PCT/KR2023/012822.

Communication dated Jun. 30, 2025, issued by the European Patent Office in counterpart European Application No. 23860854.1.

* cited by examiner

ELECTRONIC DEVICE AND METHOD FOR CONTROLLING DISPLAY OF AT LEAST ONE EXTERNAL OBJECT AMONG ONE OR MORE EXTERNAL OBJECTS

CROSS-REFERENCE TO RELATED APPLICATIONS

This application is a Continuation Applications of U.S. application Ser. No. 18/367,269 filed on Sep. 12, 2023, which is a continuation of International Application No. PCT/KR2023/012822 designating the United States, filed on Aug. 29, 2023, in the Korean Intellectual Property Receiving Office and claiming priority to Korean Patent Application Nos. 10-2022-0111743, filed on Sep. 2, 2022, and 10-2022-0130893, filed on Oct. 12, 2022, in the Korean Intellectual Property Office, the disclosures of each of which are incorporated by referenced herein in their entireties.

BACKGROUND

Technical Field

Various embodiments relate to an electronic device and a method for controlling a display of at least one external object among one or more external objects.

Description of Related Art

Electronic devices for interaction between reality and the virtual world in virtual reality (VR), augmented reality (AR), and/or mixed reality (MR) are emerging. The electronic devices may be classified into a closed type of electronic device in which the outside is not visible, and a See-through type of electronic device in which an external environment and a display image are simultaneously viewed. The See-through type of electronic device may include a transparent display. A user of the See-through type of electronic device may view a visual object provided by the See-through type of electronic device while viewing the external environment through the transparent display. For example, the See-through type of electronic device may display simple information such as a notification message and the like or may provide the augmented reality.

SUMMARY

An electronic device according to an embodiment may comprise a camera, a display, a memory configured to store instructions, and at least one processor. The at least one processor may be configured to, when the instructions are executed, cause the electronic device to receive a first input for enabling a designated setting. The at least one processor may be configured to, when the instructions are executed, cause the electronic device to, in response to the input, recognize, from a screen being displayed through the display, a first area occupied by a first external object and a second area occupied by a second external object, based on an image being obtained via the camera. The at least one processor may be configured to, when the instructions are executed, cause the electronic device to receive a second input on the first area from among the first area and the second area, after the first area and the second area are recognized from the screen according to the designated setting. The at least one processor may be configured to, when the instructions are executed, cause the electronic device to, in response to the second input, maintain to display the first area in the screen, and cease to display the second area in the screen by displaying a visual object superimposed on the second area, wherein the visual object has color of a portion of the screen adjacent to the second area.

According to an embodiment, a method of an electronic device comprising a camera, a display, a memory configured to store instructions, and at least one processor, the method may comprise receiving a first input for enabling a designated setting. The method may comprise in response to the input, recognizing, from a screen being displayed through the display, a first area occupied by a first external object and a second area occupied by a second external object, based on an image being obtained via the camera. The method may comprise receiving a second input on the first area from among the first area and the second area, after the first area and the second area are recognized from the screen according to the designated setting. The method may comprise, in response to the second input, maintaining to display the first area in the screen, and ceasing to display the second area in the screen by displaying a visual object superimposed on the second area, wherein the visual object has color of a portion of the screen adjacent to the second area.

An electronic device according to an embodiment may comprise a camera, a display, a memory configured to store instructions, and at least one processor. The at least one processor may be configured to, when the instructions are executed, cause the electronic device to, in a first state in which one or more external objects different from the electronic device are shown through the display, identify a first area in which an external object among one or more external objects is shown. The at least one processor may be configured to, when the instructions are executed, cause the electronic device to change to a second state to cease at least temporarily display of a second area different from the first area. The at least one processor may be configured to, when the instructions are executed, cause the electronic device to identify the second area in the display based on an image obtained from the camera and display one or more visual objects based on at least one color included in the second area, superimposed on the second area, based on the image, for changing to the second state.

According to an embodiment, a method of an electronic device comprising a camera, a display, a memory configured to store instructions and at least one processor, may comprise, in a first state in which one or more external objects different from the electronic device are shown through the display, identifying a first area in which an external object among one or more external objects is shown. A method may comprise changing to a second state to cease at least temporarily display of a second area different from the first area. A method may comprise identifying the second area in the display based on an image obtained from the camera, and displaying one or more visual objects based on at least one color included in the second area, superimposed on the second area, based on the image, for changing to the second state.

DETAILED DESCRIPTION

Figure 1:
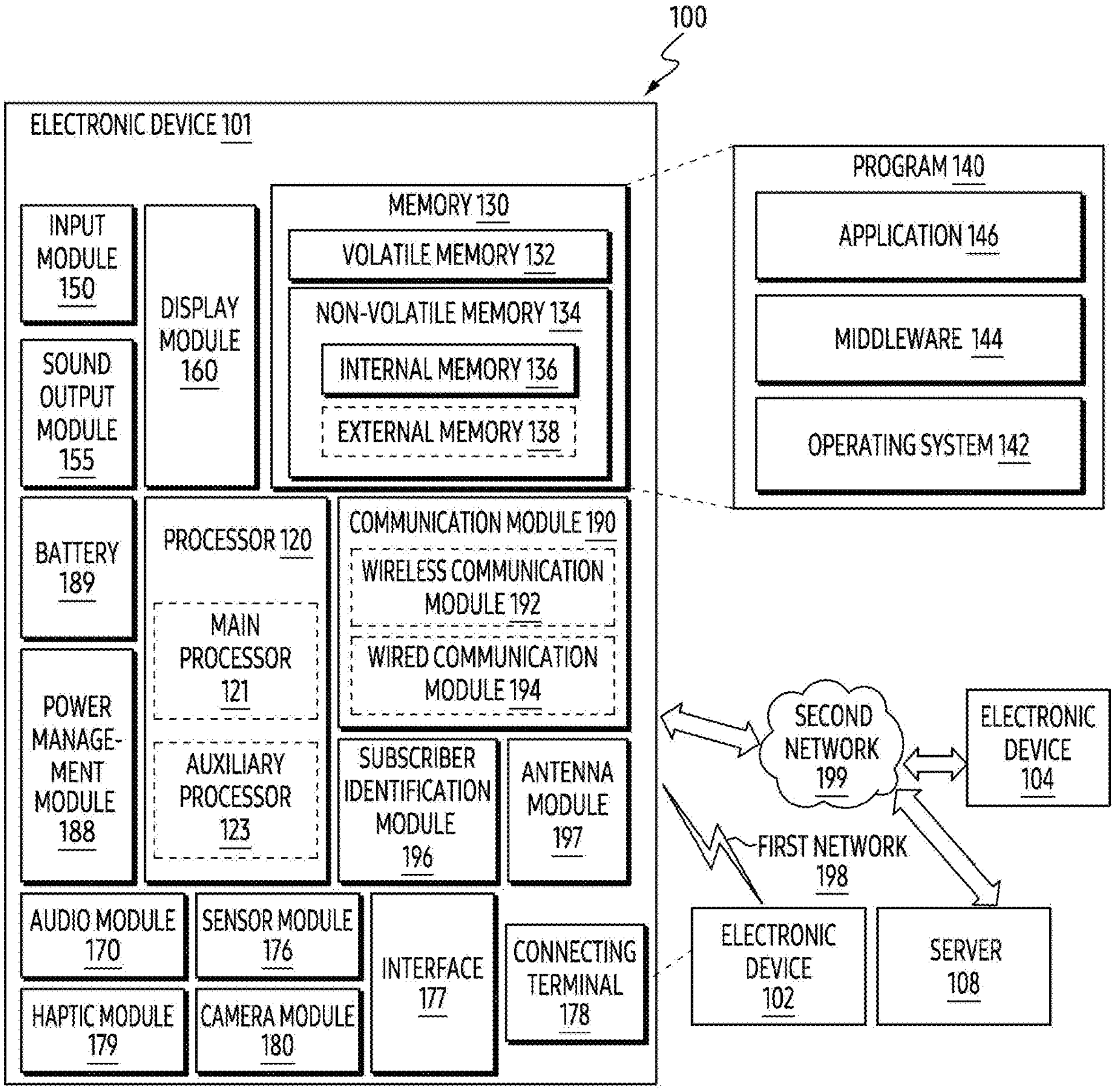
FIG. 1 is a block diagram of an electronic device in a network environment according to various embodiments.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor

123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199

(e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
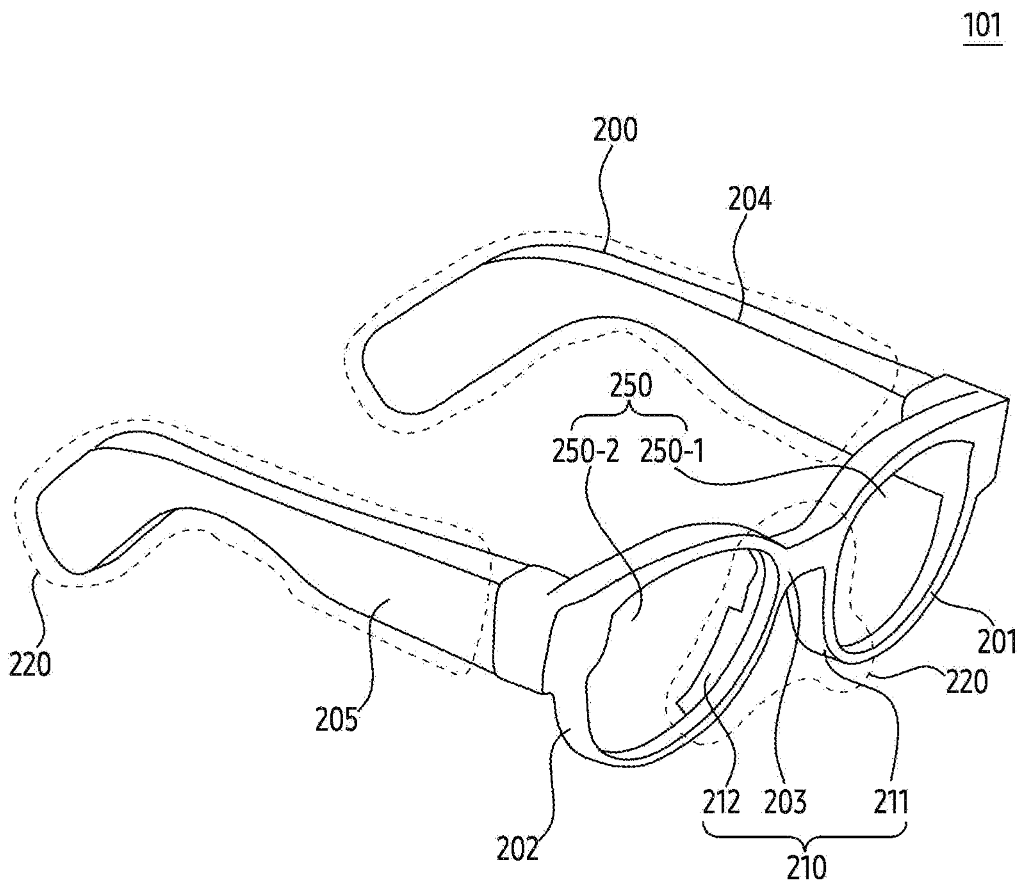
FIG. 2A illustrates an example of a perspective view of an electronic device according to an embodiment.
Figure 2B:
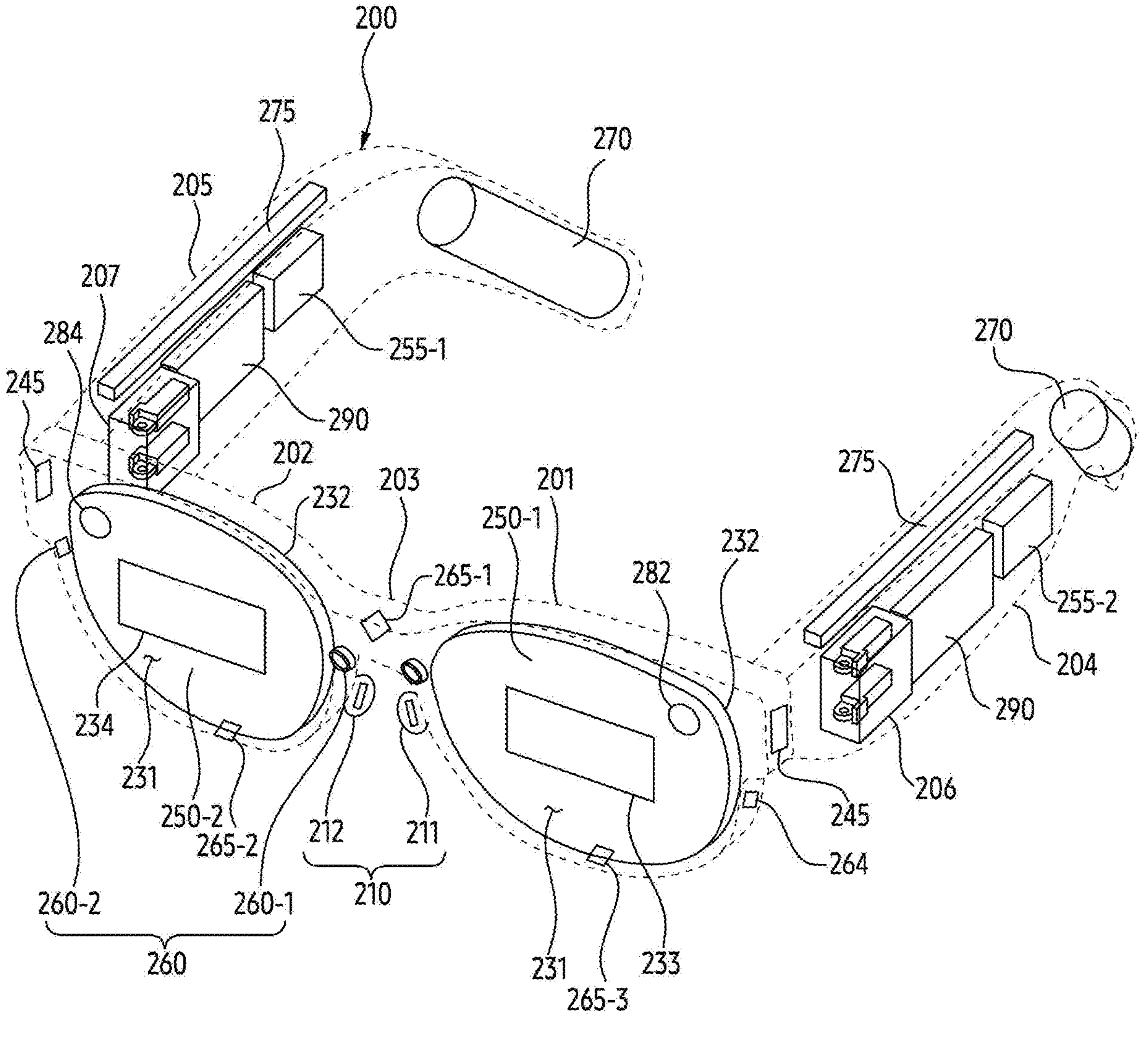
FIG. 2B illustrates an example of one or more hardware disposed in an electronic device according to an embodiment.

FIG. 2A illustrates an example of a perspective view of an electronic device according to an embodiment. FIG. 2B illustrates an example of one or more hardware disposed in an electronic device according to an embodiment. According to an embodiment, an electronic device 101 may have a form of glasses that are wearable on a user's body part (e.g., head). The electronic device 101 may be referred to as a wearable device. The electronic device 101 of FIGS. 2A and 2B may be an example of the electronic device 101 of FIG. 1. The electronic device 101 may include a head-mounted display (HMD). For example, a housing of the electronic device 101 may include a flexible material such as rubber and/or silicon having a form that closely adheres to a portion of the user's head (e.g., a portion of the face surrounding both eyes). For example, the housing of the electronic device 101 may include one or more straps that are able to be twined around the user's head and/or one or more temples that are attachable to the ears of the head.

Referring to FIG. 2A, according to an embodiment, the electronic device 101 may include at least one display 250 and a frame 200 supporting the at least one display 250.

According to an embodiment, the electronic device 101 may be worn on a portion of the user's body. The electronic device 101 may provide augmented reality (AR), virtual reality (VR), or mixed reality (MR) in which augmented reality and virtual reality are mixed, to the user wearing the electronic device 101. For example, the electronic device 101 may display a virtual reality image provided from at least one optical device 282, 284 of FIG. 2B on the at least one display 250, in response to a user's specified gesture obtained through motion recognition cameras 260-2 and 264 of FIG. 2B.

According to an embodiment, the at least one display 250 may provide visual information to the user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left and right eyes, respectively.

Referring to FIG. 2B, the at least one display 250 may provide visual information transmitted from ambient light and other visual information distinct from the visual information to the user through the lens included in the at least one display 250. The lens may be formed based on at least one of a fresnel lens, a pancake lens, or a multi-channel lens. For example, the at least one display 250 may include a first surface 231 and a second surface 232 opposite to the first surface 231. A display area may be formed on the second surface 232 of the at least one display 250. When the user wears the electronic device 101, the ambient light may be transmitted to the user by being incident on the first surface 231 and penetrated through the second surface 232. For another example, the at least one display 250 may display an augmented reality image in which the virtual reality image provided from the at least one optical device 282, 284 is combined with a reality screen transmitted through the ambient light, on the display area formed on the second surface 232.

In an embodiment, the at least one display 250 may include at least one waveguide 233, 234 that diffracts light transmitted from the at least one optical device 282, 284 and transmits the diffracted light to the user. The at least one waveguide 233, 234 may be formed based on at least one of glass, plastic, or polymer. A nano pattern may be formed on at least a portion of the outside or inside of the at least one waveguide 233, 234. The nano pattern may be formed based on a grating structure having a shape of a polygon and/or a curved surface. Light incident to one end of the at least one waveguide 233, 234 may be propagated to the other end of the at least one waveguide 233, 234 by the nano pattern. The at least one waveguide 233, 234 may include at least one of at least one diffractive element (e.g., a diffractive optical element (DOE), a holographic optical element (HOE)) or a reflective element (e.g., a reflective mirror). For example, the at least one waveguide 233, 234 may be disposed in the electronic device 101 to guide a screen displayed by the at least one display 250 to the user's eyes. For example, the screen may be transmitted to the user's eyes based on total internal reflection (TIR) generated in the at least one waveguide 233, 234.

The electronic device 101 may analyze an object included in a reality image collected through a photographing camera 245, combine a virtual object corresponding to an object that becomes a subject of augmented reality provision among the analyzed objects, and display it on the at least one display 250. The virtual object may include at least one of text and images for various information associated with the object included in the reality picture. The electronic device 101 may analyze the object based on a multi-camera such as a stereo camera. For the object analysis, the electronic device 101 may execute time-of-flight (ToF) and/or simultaneous localization and mapping (SLAM) supported by the multi-camera. The user wearing the electronic device 101 may watch the image displayed on the at least one display 250.

According to an embodiment, the frame 200 may be configured with a physical structure in which the electronic device 101 may be worn on the user's body. According to an embodiment, the frame 200 may be configured such that when the user wears the electronic device 101, the first display 250-1 and the second display 250-2 may be positioned corresponding to the user's left and right eyes. The frame 200 may support the at least one display 250. For example, the frame 200 may support the first display 250-1 and the second display 250-2 to be positioned at positions corresponding to the user's left and right eyes.

Referring to FIG. 2A, the frame 200 may include an area 220 at least a portion of which is in contact with the portion of the user's body, in case that the user wears the electronic device 101. For example, the area 220 in contact with the portion of the user's body of the frame 200 may include an area in contact with a portion of a user's nose, a portion of a user's ear, and a portion of a side surface of a user's face, that the electronic device 101 contacts. According to an embodiment, the frame 200 may include a nose pad 210 that is contacted on the portion of the user's body. When the electronic device 101 is worn by the user, the nose pad 210 may be contacted on the portion of the user's nose. The frame 200 may include a first temple 204 and a second temple 205 that is contacted on another portion of the user's body that is distinct from the portion of the user's body.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to an embodiment, the electronic device 101 may identify an external object (e.g., a user's fingertip) touching the frame 200 and/or a gesture performed by the external object by using a touch sensor, a grip sensor, and/or a proximity sensor formed on at least a portion of a surface of the frame 200.

According to an embodiment, the electronic device 101 may include hardware (e.g., hardware to be described later based on a block diagram of FIG. 4) that performs various functions. For example, the hardware may include a battery module 270, an antenna module 275, the at least one optical device 282, 284, speakers (e.g., speakers 255-1 and 255-2), a microphone (e.g., microphones 265-1, 265-2, and 265-3), a light emitting module (not illustrated), and/or a printed circuit board (PCB) 290 (e.g., a printed circuit board). Various hardware may be disposed in the frame 200.

According to an embodiment, the microphone (e.g., the microphones 265-1, 265-2, and 265-3) of the electronic device 101 may obtain a sound signal, by being disposed on at least a portion of the frame 200. The first microphone 265-1 disposed on the nose pad 210, the second microphone 265-2 disposed on the second rim 202, and the third microphone 265-3 disposed on the first rim 201 are illustrated in FIG. 2B, but the number and disposition of the microphone 265 are not limited to an embodiment of FIG. 2B. In case that the number of microphones 265 included in the electronic device 101 is two or more, the electronic device 101 may identify the direction of the sound signal by using a plurality of microphones disposed on different portions of the frame 200.

According to an embodiment, the at least one optical device 282, 284 may project the virtual object to the at least one display 250, in order to provide various image information to the user. For example, the at least one optical device 282, 284 may be a projector. The at least one optical device 282, 284 may be disposed adjacent to the at least one display 250 or may be included in the at least one display 250 as a portion of the at least one display 250. According to an embodiment, the electronic device 101 may include a first optical device 282 corresponding to the first display 250-1 and a second optical device 284 corresponding to the second display 250-2. For example, the at least one optical device 282, 284 may include the first optical device 282 disposed at an edge of the first display 250-1 and the second optical device 284 disposed at an edge of the second display 250-2. The first optical device 282 may transmit light to the first waveguide 233 disposed on the first display 250-1, and the second optical device 284 may transmit light to the second waveguide 234 disposed on the second display 250-2.

In an embodiment, a camera 260 may include the photographing camera 245, an eye tracking camera (ET CAM) 260-1, and/or the motion recognition cameras 260-2 and 264. The photographing camera 245, the eye tracking camera (ET CAM) 260-1, and the motion recognition cameras 260-2 and 264 may be disposed at different positions on the frame 200 and may perform different functions. The eye tracking camera (ET CAM) 260-1 may output data indicating the gaze of the user wearing the electronic device 101. For example, the electronic device 101 may detect the gaze from an image including a user's pupil obtained through the eye tracking camera (ET CAM) 260-1. Although an example in which the eye tracking camera (ET CAM) 260-1 is disposed toward the user's right eye is illustrated in FIG. 2B, the embodiment is not limited thereto, and the eye tracking camera (ET CAM) 260-1 may be disposed alone toward the user's left eye or may be disposed toward both eyes.

In an embodiment, the photographing camera 245 may photograph a real image or background to be matched with a virtual image in order to implement the augmented reality or mixed reality content. The photographing camera may photograph an image of a specific object existing at a position (e.g., a FoV 230 of FIG. 2) viewed by the user and may provide the image to the at least one display 250. The at least one display 250 may display one image in which a virtual image provided through the at least one optical device 282, 284 is overlapped with information on the real image or background including an image of the specific object obtained by using the photographing camera 245. In an embodiment, the photographing camera may be disposed on the bridge 203 disposed between the first rim 201 and the second rim 202.

In an embodiment, the eye tracking camera (ET CAM) 260-1 may implement a more realistic augmented reality by matching the user's gaze with the visual information provided on the at least one display 250 by tracking the gaze of the user wearing the electronic device 101. For example, when the user looks at the front, the electronic device 101 may naturally display environment information associated with the user's front on the at least one display 250 at the position where the user is positioned. The eye tracking camera (ET CAM) 260-1 may be configured to capture an image of the user's pupil in order to determine the user's gaze. For example, the eye tracking camera (ET CAM) 260-1 may receive gaze detection light reflected from the user's pupil and may track the user's gaze based on the position and movement of the received gaze detection light. In an embodiment, the eye tracking camera (ET CAM) 260-1 may be disposed at a position corresponding to the user's left and right eyes. For example, the eye tracking camera (ET CAM) 260-1 may be disposed in the first rim 201 and/or the second rim 202 to face the direction in which the user wearing the electronic device 101 is positioned.

The motion recognition cameras 260-2 and 264 may provide a specific event to the screen provided on the at least one display 250 by recognizing the movement of the whole or portion of the user's body, such as the user's torso, hand, or face and the like. The motion recognition cameras 260-2 and 264 may obtain a signal corresponding to the motion by recognizing the user's gesture, and may provide a display corresponding to the signal to the at least one display 250. The processor may identify a signal corresponding to the motion and may perform a specified function based on the identification. In an embodiment, the motion recognition cameras 260-2 and 264 may be disposed on the first rim 201 and/or the second rim 202.

In an embodiment, the camera 260 included in the electronic device 101 is not limited to the above-described eye tracking camera (ET CAM) 260-1 and the motion recognition cameras 260-2 and 264. For example, the electronic device 101 may identify an external object (e.g., an external object 220 of FIG. 2) included in the FoV by using the camera 260 disposed toward the user's FoV. That the electronic device 101 identifies the external object may be performed based on a sensor for identifying a distance between the electronic device 101 and the external object, such as a depth sensor and/or a time of flight (ToF) sensor. The camera 260 disposed toward the FoV may support an autofocus function and/or an optical image stabilization (OIS) function. For example, the electronic device 101 may include the camera 260 (e.g., a face tracking (FT) camera) disposed toward the face in order to obtain an image including the face of the user wearing the electronic device 101.

Although not illustrated, according to an embodiment, the electronic device 101 may further include a light source (e.g., LED) that emits light toward a subject (e.g., the user's eyes, face, and/or the external object in the FoV) photographed by using the camera 260. The light source may include an LED having an infrared wavelength. The light source may be disposed on at least one of the frame 200, and the hinge units 206 and 207.

According to an embodiment, the battery module 270 may supply power to electronic components of the electronic device 101. In an embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In an embodiment, the battery module 270 may be disposed at an end of the first temple 204 and/or the second temple 205.

The antenna module 275 may transmit the signal or power to the outside of the electronic device 101 or may receive the signal or power from the outside. In an embodiment, the antenna module 275 may be disposed in the first temple 204 and/or the second temple 205. For example, the antenna module 275 may be disposed close to one surface of the first temple 204 and/or the second temple 205.

The speaker 255 may output a sound signal to the outside of the electronic device 101. A sound output module may be referred to as a speaker. In an embodiment, the speaker 255 may be disposed in the first temple 204 and/or the second temple 205 in order to be disposed adjacent to the ear of the user wearing the electronic device 101. For example, the speaker 255 may include the second speaker 255-2 disposed adjacent to the user's right ear by being disposed in the first temple 204, and the first speaker 255-1 disposed adjacent to the user's left ear by being disposed in the second temple 205.

The light emitting module (not illustrated) may include at least one light emitting element. The light emitting module may emit light of a color corresponding to a specific state or may emit light in an operation corresponding to the specific state in order to visually provide information on a specific state of the electronic device 101 to the user. For example, in case that the electronic device 101 needs charging, it may emit light which is red light at regular intervals. In an embodiment, the light emitting module may be disposed on the first rim 201 and/or the second rim 202.

Referring to FIG. 2B, according to an embodiment, the electronic device 101 may include the printed circuit board (PCB) 290. The PCB 290 may be included in at least one of the first temple 204 or the second temple 205. The PCB 290 may include an interposer disposed between at least two sub PCBs. On the PCB 290, one or more hardware (e.g., hardware illustrated by different blocks of FIG. 5) included in the electronic device 101 may be disposed. The electronic device 101 may include a flexible PCB (FPCB) for interconnecting the hardware.

According to an embodiment, the electronic device 101 may include at least one of a gyro sensor, a gravity sensor, and/or an acceleration sensor for detecting the posture of the electronic device 101 and/or the posture of a body part (e.g., a head) of the user wearing the electronic device 101. Each of the gravity sensor and the acceleration sensor may measure gravity acceleration, and/or acceleration based on specified three-dimensional axes (e.g., x-axis, y-axis, and z-axis) perpendicular to each other. The gyro sensor may measure angular velocity of each of specified three-dimensional axes (e.g., x-axis, y-axis, and z-axis). At least one of the gravity sensor, the acceleration sensor, and the gyro sensor may be referred to as an inertial measurement unit (IMU). According to an embodiment, the electronic device 101 may identify the user's motion and/or gesture performed to execute or cease a specific function of the electronic device 101 based on the IMU.

Figure 3A:
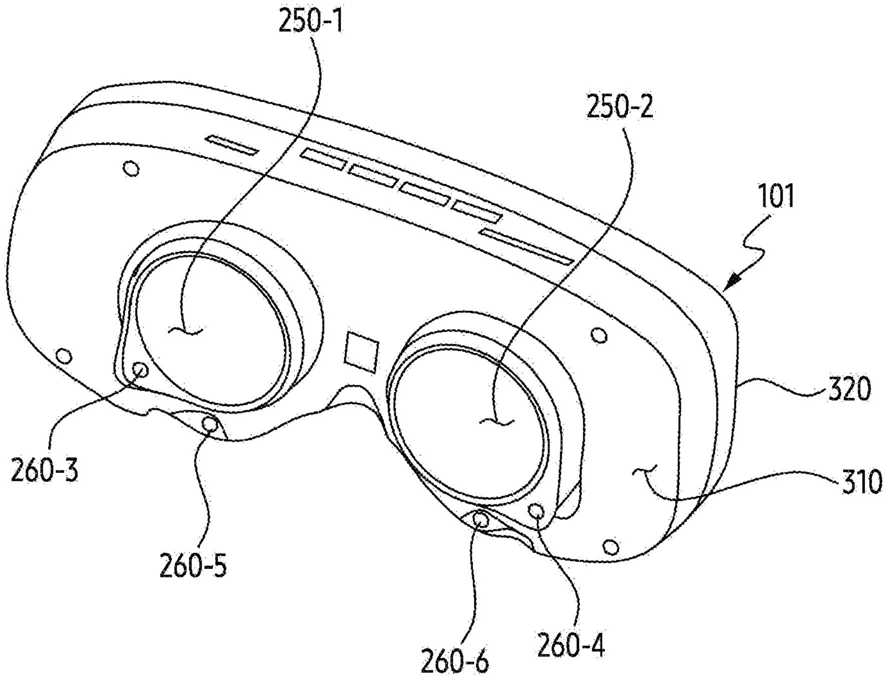
FIGS. 3A to 3B illustrate an example of the appearance of an electronic device according to an embodiment.
Figure 3B:
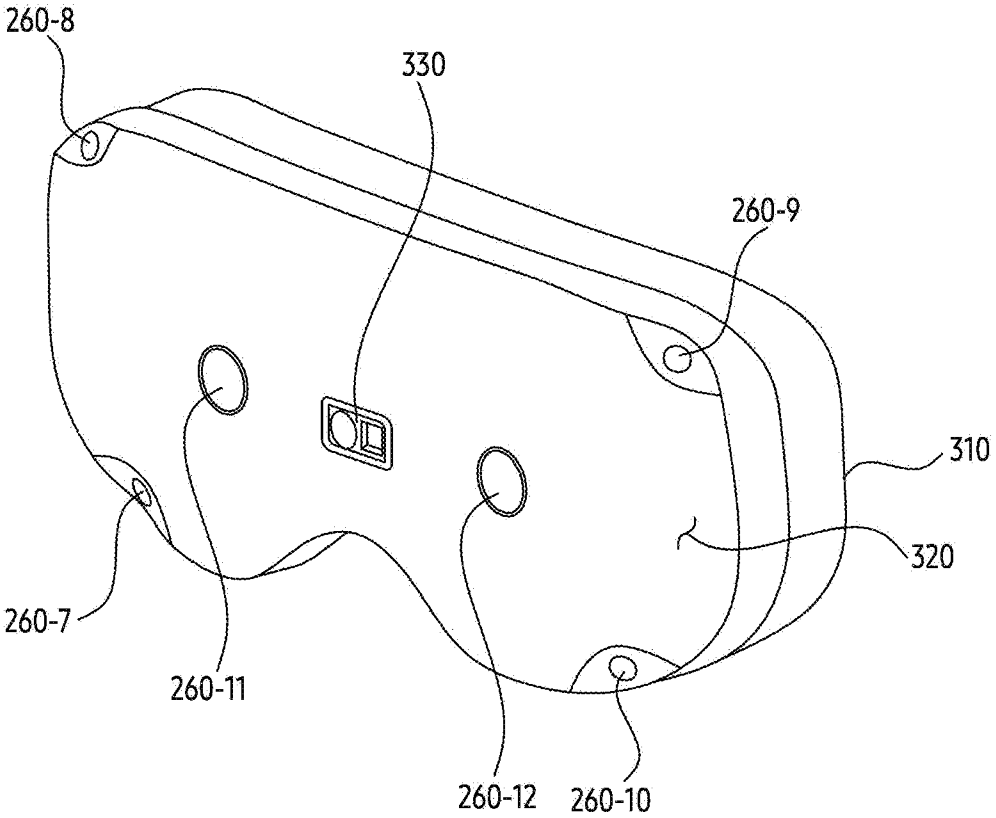

FIGS. 3A to 3B illustrate an example of the appearance of an electronic device according to an embodiment. An electronic device 101 of FIGS. 3A to 3B may be an example of the electronic device 101 of FIG. 1. According to an embodiment, an example of an appearance of a first surface 310 of a housing of the electronic device 101 is illustrate in FIG. 3A, and an example of an appearance of a second surface 320 opposite to the first surface 310 may be illustrate in FIG. 3B.

Referring to FIG. 3A, according to an embodiment, the first surface 310 of the electronic device 101 may have an attachable form on a user's body part (e.g., a user's face). Although not illustrated, the electronic device 101 may further include a strap for being fixed on the user's body part, and/or one or more temples (e.g., a first temple 204 and/or a second temple 205 of FIGS. 2A to 2B). A first display 250-1 for outputting an image to the left eye among the user's both eyes and a second display 250-2 for outputting an image to the right eye among the user's both eyes may be disposed on the first surface 310. The electronic device 101 may be formed on the first surface 310 and may further include rubber or silicon packing for preventing interference by light (e.g., ambient light) different from the light emitted from the first display 250-1 and the second display 250-2.

According to an embodiment, the electronic device 101 may include cameras 260-3 and 260-4 for photographing and/or tracking both eyes of the user adjacent to each of the first display 250-1 and the second display 250-2. The cameras 260-3 and 260-4 may be referred to as ET cameras. According to an embodiment, the electronic device 101 may include cameras 260-5 and 260-6 for photographing and/or recognizing the user's face. The cameras 260-5 and 260-6 may be referred to as FT cameras.

Referring to FIG. 3B, a camera (e.g., cameras 260-7, 260-8, 260-9, 260-10, 260-11, and 260-12), and/or a sensor (e.g., a depth sensor 330) for obtaining information associated with the external environment of the electronic device 101 may be disposed on the second surface 320 opposite to the first surface 310 of FIG. 3A. For example, the cameras 260-7, 260-8, 260-9, and 260-10 may be disposed on the second surface 320 in order to recognize an external object (e.g., an external object 220 of FIG. 2) different from the electronic device 101. For example, by using cameras 260-11, and 260-12, the electronic device 101 may obtain an image and/or video to be transmitted to each of the user's both eyes. The camera 260-11 may be disposed on the second surface 320 of the electronic device 101 to obtain an image to be displayed through the second display 250-2 corresponding to the right eye among the both eyes. The camera 260-12 may be disposed on the second surface 320 of the electronic device 101 to obtain an image to be displayed through the first display 250-1 corresponding to the left eye among the both eyes.

According to an embodiment, the electronic device 101 may include the depth sensor 330 disposed on the second surface 320 in order to identify a distance between the electronic device 101 and the external object. By using the depth sensor 330, the electronic device 101 may obtain spatial information (e.g., a depth map) on at least a portion of the FoV of the user wearing the electronic device 101.

Although not illustrated, a microphone for obtaining sound outputted from the external object may be disposed on the second surface 320 of the electronic device 101. The number of microphones may be one or more according to embodiments.

As described above, according to an embodiment, the electronic device 101 may include hardware (e.g., cameras 240-11 and 240-12, and/or the depth sensor 330) for identifying a body part including a user's hand. The electronic device 101 may identify a gesture indicated by a motion of the body part. The electronic device 101 may provide a UI based on the identified gesture to the user wearing the electronic device 101. The UI may support a function for editing an image and/or video stored in the electronic device 101. The electronic device 101 may communicate with an external electronic device different from the electronic device 101 in order to more accurately identify the gesture.

Figure 4:
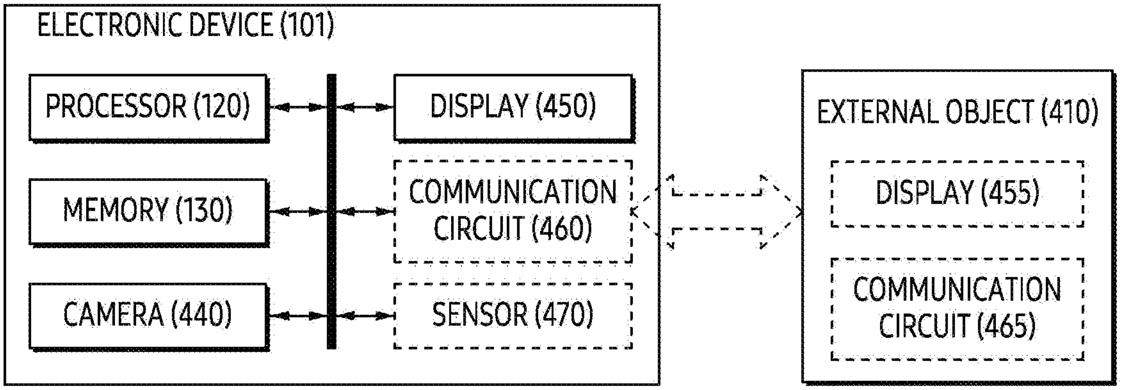
FIG. 4 is an exemplary block diagram of an electronic device according to an embodiment.

FIG. 4 is an exemplary block diagram of an electronic device according to an embodiment. An electronic device 101 of FIG. 4 may be an example of the electronic device 101 of FIG. 1 and the electronic device 101 of FIGS. 2A to 2B. Referring to FIG. 4, an exemplary situation in which the electronic device 101 and an external object 410 are connected to each other based on a wired network and/or a wireless network is illustrated. The wired network may include a network such as the Internet, a local area network (LAN), a wide area network (WAN), Ethernet, or a combination thereof. The wireless network may include a network such as long term evolution (LTE), 5G new radio (NR), wireless fidelity (WiFi), Zigbee, near field communication (NFC), Bluetooth, bluetooth low-energy (BLE), or a combination thereof. Although the electronic device 101 and the external object 410 are illustrated as being directly connected, the electronic device 101 and the external object 410 may be indirectly connected through one or more routers and/or access points (APs).

Referring to FIG. 4, according to an embodiment, the electronic device 101 may include at least one of a processor 120, a memory 130, a camera 440, a display 450, a communication circuit 460, or a sensor 470. The processor 120, the memory 130, the camera 440, the display 450, the communication circuitry 460, and the sensor 470 may be electronically and/or operably coupled with each other by an electronical component such as a communication bus. Hereinafter, that hardware components are operably coupled with each other may mean that a direct connection or an indirect connection between hardware components is established by wire or wirelessly so that a second hardware component is controlled by a first hardware component among the hardware components. Although illustrated based on different blocks, the embodiment is not limited thereto, a portion (e.g., at least a portion of the processor 120, the memory 130, and the communication circuit 460) of the hardware component illustrated in FIG. 4 may be included in a single integrated circuit such as a system on a chip (SoC). The type and/or number of hardware component included in the electronic device 101 is not limited as illustrated in FIG. 4. For example, the electronic device 101 may include only a portion of the hardware component illustrated in FIG. 4.

According to an embodiment, the processor 120 of the electronic device 101 may include a hardware component for processing data based on one or more instructions. The hardware component for processing data may include, for example, an arithmetic and logic unit (ALU), a floating point unit (FPU), a field programmable gate array (FPGA), and/or a central processing unit (CPU). The number of processors 120 may be one or more. For example, the processor 120 may have a structure of a multi-core processor such as a dual core, quad core, or hexa core. The processor 120 of FIG. 4 may include the processor 120 of FIG. 1.

According to an embodiment, the memory 130 of the electronic device 101 may include a hardware component for storing data and/or instructions inputted to the processor 120, and/or outputted from the processor 120. The memory 130 may include, for example, volatile memory such as random-access memory (RAM), and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, and an embedded multi media card (eMMC). The memory 130 of FIG. 4 may include the memory 130 of FIG. 1.

In the memory 130, one or more instructions indicating a calculation and/or operation to be performed by processor 120 on data may be stored. A set of one or more instructions may be referred to as firmware, operating system, process, routine, sub-routine, and/or application. For example, the electronic device 101 and/or the processor 120 may perform at least one of the operations of FIG. 9 or FIG. 11 when a set of a plurality of instructions distributed in the form of the operating system, firmware, driver, and/or application is executed. Hereinafter, that the application is installed in the electronic device 101 means that the one or more instructions provided in the form of the application are stored in the memory 130 of the electronic device 101, and the one or more applications are stored in a format (e.g., a file having an extension specified by the operating system of the electronic device 101) executable by the processor 120 of the electronic device 101.

According to an embodiment, the camera 440 of the electronic device 101 may include one or more optical sensors (e.g., a charged coupled device (CCD) sensor or a complementary metal oxide semiconductor (CMOS) sensor) that generate an electrical signal indicating the color and/or brightness of light. A plurality of optical sensors included in the camera 440 may be disposed in the form of a 2 dimensional array. The camera 440 may generate an image including a plurality of pixels arranged in 2 dimensions and corresponding to light reaching the optical sensors of the 2 dimensional array, by obtaining the electrical signal of each of the plurality of optical sensors substantially simultaneously. For example, photo data captured using the camera 440 may mean one image obtained from the camera 440. For example, video data captured using the camera 440 may mean a sequence of a plurality of images obtained from the camera 440 according to a specified frame rate. The electronic device 101 according to an embodiment may be disposed toward the direction in which the camera 440 receives light, and may further include a flash light for outputting light in the direction. As described above with reference to FIGS. 2A to 2B and/or FIGS. 3A to 3B, the number of cameras 440 included in the electronic device 101 may be one or more.

According to an embodiment, the camera 440 of the electronic device 101 may include a depth camera. The depth camera may include the flash light and/or an infrared diode that emits light to the outside. The depth camera may include one or more infrared light sensors that detect the intensity of the infrared light. The depth camera may measure the degree to which the infrared light emitted from the infrared diode is reflected by using the one or more infrared light sensors. In an embodiment, the degree to which the infrared light is reflected may be measured substantially simultaneously by a plurality of infrared light sensors in the depth camera. The depth camera may generate frame data including a depth value based on the degree to which the infrared light measured by the plurality of infrared light sensors is reflected. The depth value may be associated with a distance between the subject captured by the camera 440 and the camera 440. For example, the electronic device 101 may obtain at least one image data based on the distance between the subject and the camera 440 and/or the electronic device 101. An operation in which the electronic device 101 obtains the at least one image data will be described later in FIG. 6.

In an embodiment, a FoV of the camera 440 is an area in which a lens of the camera 440 is formed based on a view angle capable of receiving light, and may correspond to an area corresponding to an image generated by the camera 440. Hereinafter, the subject and/or an external object mean an thing included in the FoV of the camera 440 and distinct from the electronic device 101. In an embodiment, the FoV of the camera 440 may at least partially match the environment shown to the user through the display 450, such as a FoV 550 of FIG. 5 described later. The camera 440 may include a camera module 180 of FIG. 1.

According to an embodiment, the display 450 of the electronic device 101 may output visualized information to the user. The number of displays 450 included in the electronic device 101 may be one or more. For example, the display 450 may output the visualized information to the user, by being controlled by the processor 120 and/or a graphic processing unit (GPU) (not illustrated). The display 450 may include a flat panel display (FPD) and/or electronic paper. The FPD may include a liquid crystal display (LCD), a plasma display panel (PDP), a digital mirror device (DMD), one or more light emitting diodes (LEDs), and/or a micro LED. The LED may include organic LED (OLED). The display 450 of FIG. 4 may include a display module 160 of FIG. 1.

In an embodiment, penetration of light may occur in at least a portion of the display 450. The electronic device 101 may provide a user experience associated with augmented reality, by providing a combination of light outputted through the display 450 and light penetrated through the display 450, to the user. As described above with reference to FIGS. 2A to 2B and/or 3A to 3B, according to an embodiment, the display 450 of the electronic device 101 may have a structure for covering the entire user's field-of-view (FoV) or emitting light toward the above FoV in a state worn on the user's body part such as the head.

For example, the electronic device 101 may display an image obtained through the camera 440, through the display 450. For example, the electronic device 101 may identify external objects included in the image by using data on external objects obtainable using the sensor 470 to be described later. The electronic device 101 may temporarily cease displaying the selected at least one external object in response to an input indicating that at least one of the external objects is selected. For example, in order to temporarily cease the display, the electronic device 101 may display at least one visual object superimposed on a display area where the at least one external object is shown in the display 450. An operation in which the electronic device 101 displays the visual object superimposed on the area where the at least one selected external object is shown will be described later with reference to FIGS. 7 and 8.

Although not illustrated, the electronic device 101 may include another output mean for outputting information in another form other than a visual form or an auditory form. For example, the electronic device 101 may include at least one speaker for outputting an audio signal and/or a motor (or actuator) for providing haptic feedback based on vibration.

According to an embodiment, the communication circuit 460 of the electronic device 101 may include hardware for supporting transmission and/or reception of an electrical signal between the electronic device 101 and the external object 410. The communication circuit 460 may include, for example, at least one of a modem (MODEM), an antenna, and an optic/electronic (O/E) converter. The communication circuit 460 may support transmission and/or reception of the electrical signal based on various types of protocols, such as ethernet, local area network (LAN), wide area network (WAN), wireless fidelity (WiFi), Bluetooth, bluetooth low energy (BLE), ZigBee, long term evolution (LTE), and 5G new radio (NR). The communication circuit 460 of FIG. 4 may include a communication module 190 and/or an antenna module 197 of FIG. 1.

The sensor 470 of the electronic device 101 according to an embodiment may generate electronic information that may be processed by the processor 120 and/or the memory 130 from non-electronic information associated with the electronic device 101. The electronic information generated by the sensor 470 may be stored in the memory 130, processed by the processor 120, and/or transmitted to another electronic device distinct from the electronic device 101. The embodiment of electronic device 101 is not limited to the type and/or number of one or more sensors illustrated in FIG. 4. For example, the sensor 470 may further include a grip sensor capable of identifying a contact between the electronic device 101 and the external object (e.g., the user), and/or a gyro sensor or acceleration sensor capable of identifying a movement of the electronic device 101.

For example, the electronic device 101 may identify the movement of the electronic device 101, by using the sensor 470. For example, the electronic device 101 may identify acceleration by using the acceleration sensor (not illustrated). The acceleration may be a vector based on the direction and/or magnitude of a net force applied to the electronic device 101. For example, the acceleration may be a vector indicating an amount of change of speed of the electronic device 101 due to the net force. The net force applied to the electronic device 101 may include gravity or a combination of other forces distinct from the gravity. According to an embodiment, the acceleration sensor of the electronic device 101 may identify rotation of the acceleration sensor based on one or more axes. For example, the number of acceleration sensors included in the electronic device 101 may be one or more. According to an embodiment, the electronic device 101 may identify the movement of the electronic device 101 based on the acceleration and/or rotation identified by each of the acceleration sensors.

For example, the electronic device 101 may identify head tracking (HeT), based on identifying the movement of the electronic device 101 by using the sensor 470. For example, the electronic device 101 may initiate execution of at least one function, based on the identified HeT. For example, the at least one function may mean execution and/or termination of an application installed in the electronic device 101. For example, based on performing the at least one function, the electronic device 101 may display a user UI corresponding to the at least one function in the display 450.

The electronic device 101 according to an embodiment may obtain data for an image different from the image, based on an image obtained from the camera 440, by using the sensor 470. For example, based on a time of flight (ToF) sensor, the electronic device 101 may identify a distance between the electronic device 101 and the external object. Based on the identified distance, the electronic device 101 may obtain information (e.g., distance information) on the external object. An operation in which the electronic device 101 obtains data on the different images based on the ToF sensor will be described later in FIG. 6.

Referring to FIG. 4, an example of a block diagram of the external object 410 connectable to the electronic device 101 according to an embodiment is illustrated. The external object 410 may include at least one of a display 455 and/or a communication circuit 465. The display 455 and the communication circuit 465 may be electronically and/or operably coupled with each other by a communication bus in the external object 410. The display 455 and the communication circuit 465 in the external object 410 may perform functions substantially similar to those of the display 450 and the communication circuit 460 in the electronic device 101. Hereinafter, among descriptions of the display 455 and the communication circuit 465 in the external object 410, descriptions overlapping with the display 450 and the communication circuit 460 of the electronic device 101 may be omitted to reduce repetition.

According to an embodiment, the electronic device 101 may obtain information from the external object 410 based on a communication link established between the communication circuit 460 of the electronic device 101 and the communication circuit 465 of the external object 410. The communication link may be established based on a short-range wireless communication protocol such as Bluetooth, bluetooth low-energy (BLE), Wi-Fi Direct, and/or near field communication (NFC). For example, the communication link may be established based on pairing of the Bluetooth-based electronic device 101 and the external object 410. The communication link is not limited to the above-described short-range wireless communication protocol, and may be established by a wired communication protocol such as universal serial bus (USB) and/or a protocol dedicated for communication between the electronic device 101 and the external object 410.

For example, the electronic device 101 may at least temporarily control the external object 410 based on the communication circuit 460. For example, the electronic device 101 may identify the external object 410 for which a communication link is established using the communication circuit 460, in the image obtained through the camera 440. Based on identifying the external object 410, the electronic device 101 may temporarily control that the external object 410 displays at least one screen through the display 455. An operation in which the electronic device 101 temporarily controls the display of the display 455 of the external object 410 based on a communication link established using the communication circuit 460 and/or the communication circuit 465 of the external object 410 will be described later in FIG. 10.

As described above, the electronic device 101 may display a visual object covering at least one external object to the user through the display 450 based on the image obtained through the camera 440. For example, the electronic device 101 may identify one or more external objects included in the image. For example, the electronic device 101 may cease the at least one external object from being shown by the user, by displaying at least one visual object superimposed on an area for showing the at least one external object. By temporarily refraining from displaying the at least one external object, the electronic device may provide the user with virtual reality that may be focused on an external object different from the at least one external object.

Figure 5:
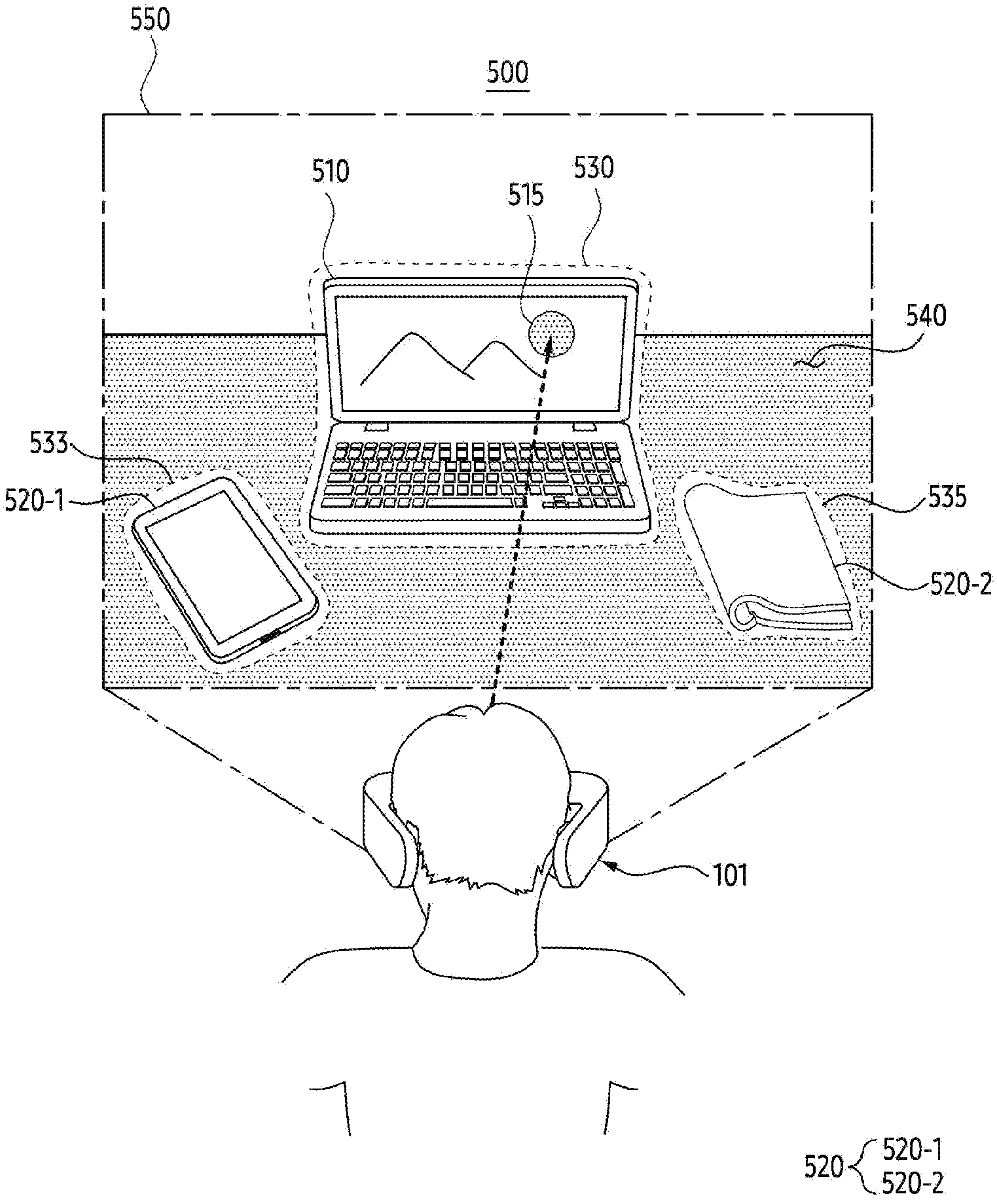
FIG. 5 illustrates an example of an operation in which an electronic device identifies one or more external objects according to an embodiment.

FIG. 5 illustrates an example of an operation in which an electronic device identifies one or more external objects according to an embodiment. An electronic device 101 may be an example of the electronic device 101 of FIG. 1. Referring to FIG. 5, a state 500 in which the electronic device 101 worn on a portion of a user's body obtains at least one or more external objects through a camera (e.g., a camera 440 of FIG. 4) or displays it through a display (e.g., a display 450 of FIG. 4) is illustrated.

Referring to FIG. 5, in the state 500, the electronic device 101 may provide a user experience (UX) based on at least one of augmented reality (AR), virtual reality (VR), or mixed reality (MR) to a user wearing the electronic device 101. For example, the electronic device 101 may display an image, text, and/or video in a field of view (FoV) 550 of the user wearing the electronic device 101 through the display (e.g., the display 450 of FIG. 4). The display may be configured to penetrate light directed to a first surface to a second surface opposite to the first surface. For example, an image displayed in the user's FoV 550 may be an example of an image obtained using a visual see through (VST) camera (not illustrated).

The electronic device 101 according to an embodiment may identify one or more external objects 510 and 520, by using at least one of the camera (e.g., the camera 440 of FIG. 4), a depth sensor, and/or a sensor (e.g., a ToF sensor among sensors 470 of FIG. 4). For example, the one or more external objects 510 and 520 may be referred to as a subject and/or a tangible object.

For example, the third external object 520-1 among the first external object 510 and/or the second external objects 520 may be a terminal which is owned by the user. The terminal may include, for example, a personal computer (PC) such as a laptop or desktop, a smartphone, a smartpad, and/or a tablet PC. At least one of the one or more external objects 510 and 520 may include a display (e.g., a display 455 of FIG. 4). The electronic device 101 may transmit a signal for inactivating the display to the at least one of the one or more external objects 510 and 520 by using the communication circuit 460. An operation in which the electronic device 101 transmits the signal will be described later in FIG. 10. For example, at least one of the second external objects 520 may be referred to an external object 410 of FIG. 4.

According to an embodiment, the electronic device 101 may identify areas 530, 533, 535, and 540 in which the one or more external objects 510 and 520 are shown in the FoV 550. For example, the electronic device 101 may obtain color information included in the areas 530, 533, 535, and 540. For example, in order to temporarily refrain from displaying a portion of the areas 530, 533, 535, and 540, the electronic device 101 may display visualized visual objects by superimposing on the portion. The visual object may include the color information. An operation in which the electronic device 101 displays visual objects by superimposing on the portion will be described later in FIG. 7.

For example, among the areas 530, 533, 535, and 540, the electronic device 101 may identify an area (e.g., the area 540) to which the largest range is assigned in the FoV 550. For example, the area (e.g., the area 540) may be an example of an area excluding areas 530, 533, and 535 in which the external objects 510 and 520 identified by the electronic device 101 are shown in the FoV 550. However, it is not limited to the above-described embodiment. For example, the electronic device 101 may identify the one or more external objects 510 and 520 and/or areas 530, 533, 535, and 540 by using image data different from an image displayed in the FoV 550. An operation in which the electronic device 101 obtains the image data will be described later in FIG. 6.

The electronic device 101 according to an embodiment may identify an input 515 by using the camera and/or the sensor. For example, electronic device 101 may identify at least a portion of the user's body part by using the camera and/or the sensor. For example, the electronic device 101 may obtain the input 515 by using eye tracking (ET), head tracking (HeT), and/or hand tracking (HaT). For example, the input 515 may be an example of an input based on identifying a user's gaze for a specified time by using an eye tracking camera (e.g., an eye tracking camera (ET CAM) 260-1 of FIG. 2). For example, the electronic device 101 may identify the input by using a controller (not illustrated) for interacting with the user. However, it is not limited to the above-described embodiment.

For example, the input 515 may be an example of an input indicating that at least one external object is selected. An operation in which the electronic device 101 display the visual object superimposed on the selected at least one external object, in response to input 515 indicating selection of at least one external object will be described later with reference to FIG. 8.

The electronic device 101 according to an embodiment may identify an input for switching (or changing) to a state different from the state 500 for at least temporarily masking at least a portion of the areas 530, 533, 535, and 540. For example, the state different from the state 500 be referred to a state 700 of FIG. 7 and/or a state 810 of FIG. 8 to be described later. In the different state, the electronic device 101 may display a visual object for masking at least a portion of the areas 530, 533, 535, and 540, by superimposing on the at least a portion, on the display. For example, in the different state, the electronic device 101 may provide the user with an environment for focusing on an external object corresponding to at least a portion of the areas.

For example, the electronic device 101 may display a visualized user interface (UI) (not illustrated) for switching to the different state on the display (e.g., the display 450 of FIG. 4). For example, the electronic device 101 may switch from the state 500 to the different state in response to an input indicating selecting the UI. For example, electronic device 101 may switch to the different state in response to an input indicating switching to the different state.

For example, the electronic device 101 may perform setting for switching to the different state. For example, in case that the electronic device 101 fails to identify movement by using the sensor (e.g., the sensor 470 of FIG. 4) for a specified time, it may switch to the different state. For example, the electronic device 101 may switch to the different state, in case that the electronic device 101 is positioned in a specified place. For example, in a specified time range, the electronic device 101 may switch to the different state. However, it is not limited to the above-described embodiment.

As described above, the electronic device 101 may identify the one or more external objects 510 and 520 adjacent to the electronic device 101 through the camera and/or the display. For example, the electronic device 101 may provide a visual object for masking at least a portion of the identified one or more external objects 510 and 520 to the user through the display. The electronic device 101 may switch to a state (e.g., concentration mode) different from the state 500 in response to an input (e.g., the input 515) indicating selecting the visual object. The electronic device 101 may improve the user's concentration on at least one (e.g., the first external object 510) among the one or more external objects 510 and 520 by providing the different states to the user. Hereinafter, an operation in which the electronic device 101 identifies the one or more external objects 510 and 520 adjacent to the electronic device 101 by using the camera and/or the sensor will be described later in FIG. 6.

Figure 6:
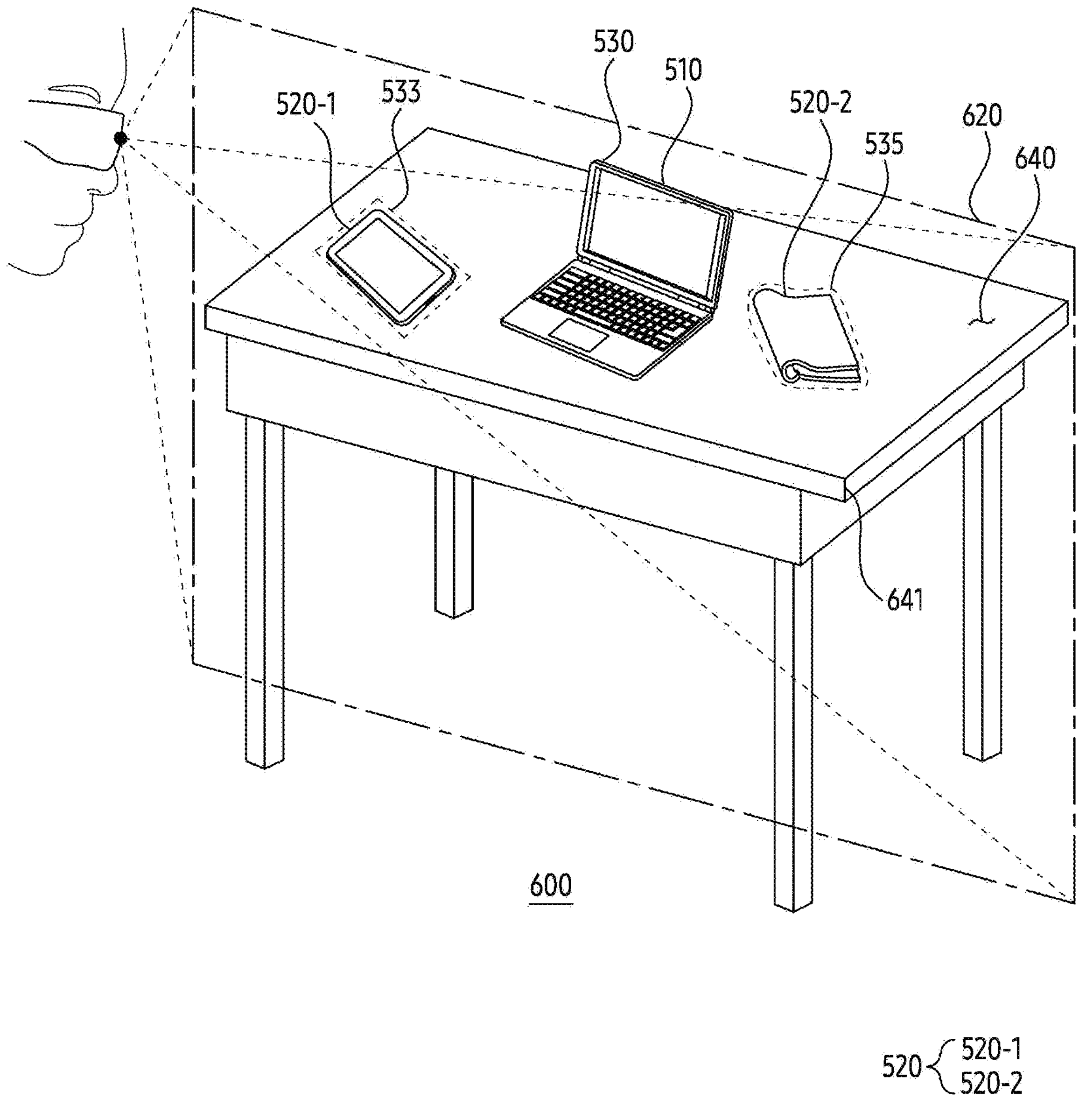
FIG. 6 illustrates an example of an operation in which, in order to identify one or more external objects in an image obtained through a camera, an electronic device according to an embodiment obtains image data different from the image.

FIG. 6 illustrates an example of an operation in which, in order to identify one or more external objects in an image obtained through a camera, an electronic device according to an embodiment obtains image data different from the image. An electronic device 101 may be an example of the electronic device 101 of FIG. 1 and/or the electronic device 101 of FIG. 2A. The one or more external objects 510 and 520 may be referred to the one or more external objects 510 and 520 of FIG. 5. FoV 620 may refer to FoV 550 of FIG. 5. A state 600 may include the electronic device 101 generating at least one image data by using a camera (e.g., a camera 440 of FIG. 4) and/or a sensor (e.g., a sensor 470 of FIG. 4).

Referring to FIG. 6, the electronic device 101 may identify the one or more external objects 510 and 520 in the FoV 620. For example, the electronic device 101 may receive light reflected by the one or more external objects 510 and 520 from light outputted from the camera by using a sensor (e.g., a ToF sensor). For example, the electronic device 101 may obtain time information based on identifying the reflected light. Based on the obtained time information, the electronic device 101 may obtain distance information between the one or more external objects 510 and 520 and the electronic device 101.

The electronic device 101 according to an embodiment may obtain the image data based on the distance information. For example, the electronic device 101 may obtain the image data, by three dimensions (3D) mapping each of the one or more external objects 510 and 520 included in the image (e.g., an image corresponding to the FoV 620) obtained from the camera based on the distance information. For example, the image data may be obtained by projecting the image corresponding to the FoV 620 to the camera and/or the sensor of the electronic device 101.

According to an embodiment, the image data may include information on one or more external objects 510, 520, and 641. For example, the information may include the distance information, the color information, and/or a type of the one or more external objects 510 and 520. For example, the electronic device 101 may identify the one or more external objects 510, 520, and 641 based on obtaining the image data. For example, the image data may be stored in a memory (e.g., a memory 130 of FIG. 4) of the electronic device 101. For example, in a state (e.g., a state 500 of FIG. 5), the electronic device 101 may perform an operation of obtaining the image data in response to an input indicating temporarily masking at least one of the one or more external objects 510, 520, and 641. However, it is not limited thereto.

The electronic device 101 according to an embodiment may distinguish areas 530, 533, 535, and 640 in which the one or more external objects 510, 520, and 641 are assigned, in the FoV 620 by using the image data. The electronic device 101 may identify a size assigned to each of the areas 530, 533, 535, and 640 in the FoV 620. The electronic device 101 may obtain color information of the area 640 based on identifying the assigned size. The area 640 may be an example of an area having the largest size in the FoV 620. The color information may include a color included in the desk 641. For example, the electronic device 101 may temporarily mask at least a portion of the areas 533, 533, 535, and 640, by displaying a visual object based on the color information, superimposing on the at least a portion of the areas 533, 533, 535, and 640. However, it is not limited to the above-described embodiment.

As described above, the electronic device 101 may obtain image data including information on the one or more external objects 510, 520, and 641 adjacent to the electronic device 101, by using the camera and/or the sensor. For example, the electronic device 101 may distinguish the one or more external objects 510, 520, and 641, by using the obtained image data. For example, the electronic device 101 may identify an input indicating selecting at least one external object among the one or more external objects 510, 520, and 641, by distinguishing the one or more external objects 510, 520, and 641. The electronic device 101 may more accurately identify the user's intention for selecting the at least one external object, by distinguishing the one or more external objects 510, 520, and 641. The electronic device 101 may cease that the selected at least one external object is shown by the user, based on identifying the user's intention.

Figure 7:
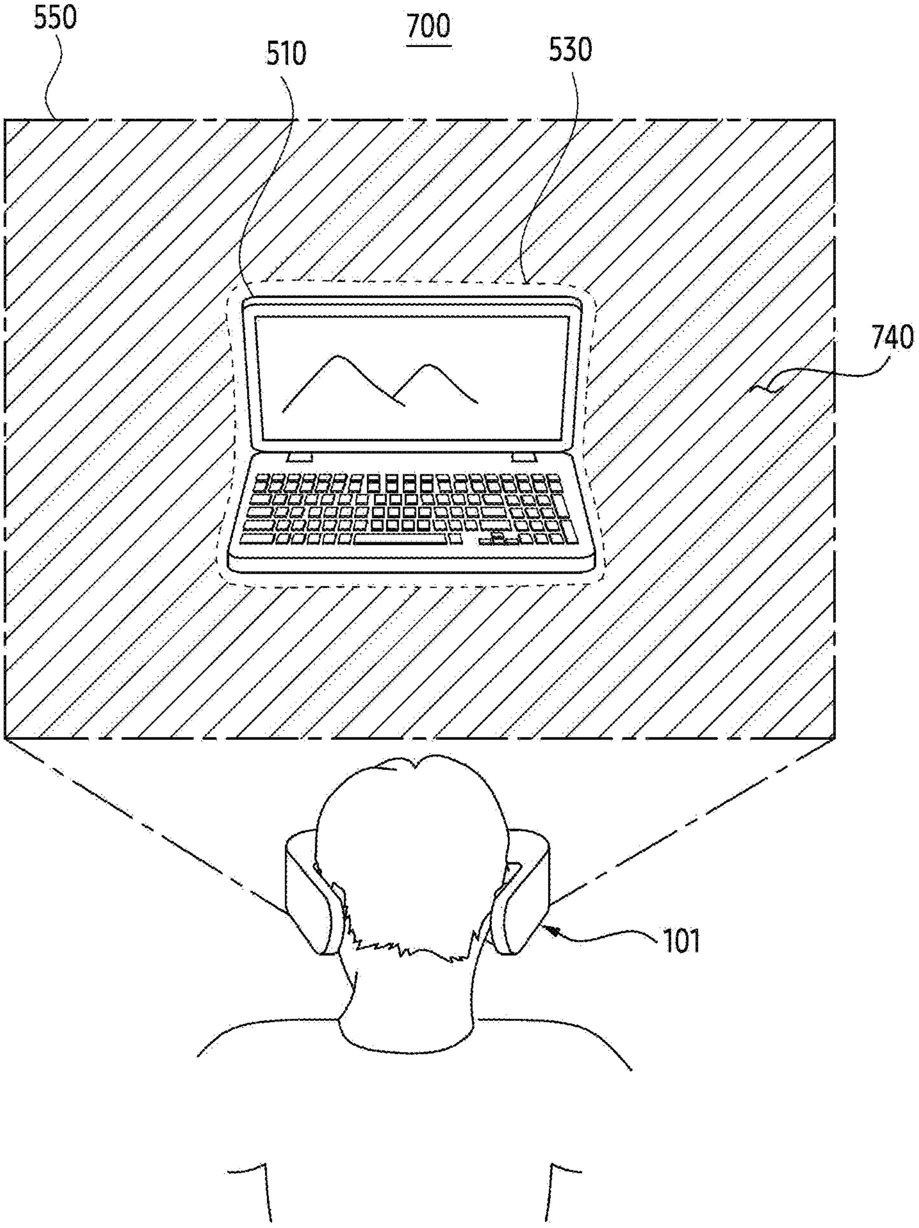
FIG. 7 illustrates an example of an operation in which an electronic device according to an embodiment adjusts the display of at least one external object among a plurality of external objects.

FIG. 7 illustrates an example of an operation in which an electronic device according to an embodiment adjusts the display of at least one external object among a plurality of external objects. An electronic device 101 may be an example of the electronic device 101 of FIG. 1 and/or the electronic device 101 of FIG. 2A. A first external object 510 may be included in one or more external objects 510 and 520 of FIG. 5.

Referring to FIG. 7, a state 700 in which the electronic device 101 masks at least one of the one or more external objects 510 and 520 included in a state 500 of FIG. 5 by using a visual object is illustrated. For example, the state 700 may be referred to a concentration mode. For example, the electronic device 101 may perform the concentration mode by using an application stored in a memory (e.g., a memory 130 of FIG. 4). For example, the electronic device 101 may provide the concentration mode service to a user by using the application. For example, the electronic device 101 may temporarily refrain from executing an application different from the application or may temporarily cease displaying a notification message generated by the different application, while providing the concentration mode service. However, it is not limited thereto.

The electronic device 101 according to an embodiment may provide a first external object 510 to the user in a FoV 550 in the state 700. For example, although not illustrated, the electronic device 101 may identify an area 530 in which the first external object 510 is shown, based on an input indicating selecting the first external object 510. For example, the electronic device 101 may obtain image data of FIG. 6 in order to identify the first external object 510 and/or the area 530. For example, in response to the input, the electronic device 101 may display the visual object in a different area 740, by distinguishing it from the area 530. For example, the area 740 may include areas 533, 535, and 540 of FIG. 5. For example, a color of the visual object displayed in the area 740 may be an example of a color of a desk 641 of FIG. 6. However, it is not limited thereto. For example, the electronic device 101 may adjust the color of the visual object displayed in the area 740.

The visual object according to an embodiment may be referred to as a virtual (or imaginary) object. The visual object may be displayed in the FoV 550 by the electronic device 101 based on an application executed by a processor (e.g., a processor 120 of FIG. 4) of the electronic device 101 and/or an input received from the user. The visual object may be displayed in the display in order to provide a user with the concentration mode executed by the electronic device 101.

For example, the electronic device 101 may identify a change of the optical axis of the camera based on the user's movement. Based on the identified change of the optical axis, a first image including at least a portion of the first external object 510 may be obtained. The electronic device 101 may display the visual object on an area different from an area in which at least a portion of the first external object 510 is displayed in the first image. For example, the electronic device 101 may obtain a second image different from the first image, based on a movement different from the movement. For example, one or more external objects different from the first external object 510 may be included in the second image. Based on obtaining the second image, the electronic device 101 may temporarily cease displaying the visual object on an area where the one or more different external objects are shown. For example, based on temporarily ceasing the display of the visual object, the user of the electronic device 101 may identify one or more different external objects included in the second image.

The electronic device 101 according to an embodiment may adjust a refresh rate of one or more pixels included in the display corresponding to the area 740 while displaying the visual object in the area 740. For example, the refresh rate may mean the number of times at least one image is displayed in the display for a specified time. For example, the electronic device 101 may reduce power consumption by reducing the refresh rate of the display corresponding to the area 740. For example, the electronic device 101 may maintain an operation based on the concentration mode for a longer time based on the reduced power consumption.

The electronic device 101 according to an embodiment may adjust a size of the area 530 in the state 700. For example, the electronic device 101 may extend the size of the area 530 in the FoV 550. For example, the electronic device 101 may enlarge a size of the first external object 510 displayed in the display as the size of the area 530 is expanded. For example, the electronic device 101 may improve the user's concentration on the first external object 510 by enlarging the size of the first external object 510.

According to an embodiment, the electronic device 101 may adjust the color and/or alpha value (e.g., an alpha value indicating opacity) of the visual object based on outdoor ambient light obtained by using the camera and/or the sensor. The electronic device 101 may reduce the stimulus to a user's body part (e.g., eyes) based on the adjusted color and/or alpha value of the visual object. For example, the user of the electronic device 101 may more clearly identify the first external object 510 based on the adjusted color and/or alpha value of the visual object.

The electronic device 101 according to an embodiment may temporarily cease displaying the visual object displayed in the area 740 in the state 700. For example, in case that a specified action is identified or the first external object 510 is not identified, using the sensor (e.g., a sensor 470 of FIG. 4), the electronic device 101 may temporarily cease displaying the visual object displayed in the area 740. For example, a state in which the display of the visual object is temporarily ceased may be referred to as the state 500 of FIG. 5. For example, the electronic device 101 may sense a movement of a user wearing the electronic device 101 by using head tracking (HeT). The electronic device 101 may identify the specified action based on the user's movement. For example, the specified action may be set by the electronic device 101 and/or the user.

As described above, the electronic device 101 may display a visual object including color information in at least a portion of the areas 530 and 740, in response to an input indicating selecting at least one of the external objects positioned in the FoV 550. The electronic device 101 may reduce the refresh rate of the area in which the visual object is displayed by displaying the visual object. The electronic device 101 may reduce power consumed by driving the electronic device 101 by reducing the refresh rate. The electronic device 101 may operate for a longer duration without requiring charging of a battery (not illustrated) included in the electronic device 101 by reducing the consumed power. The electronic device 101 may reduce heat generated by driving the electronic device 101 by reducing the consumed power. Based on reducing the heat, heat transmitted from the electronic device 101 to the user wearing the electronic device 101 may be reduced. Hereinafter, an operation in which the electronic device 101 display visual objects by overlapping on area corresponding each of one or more external object, in response to input 515 indicating to each select one and more external object will be described later with reference to FIG. 8.

Figure 8:
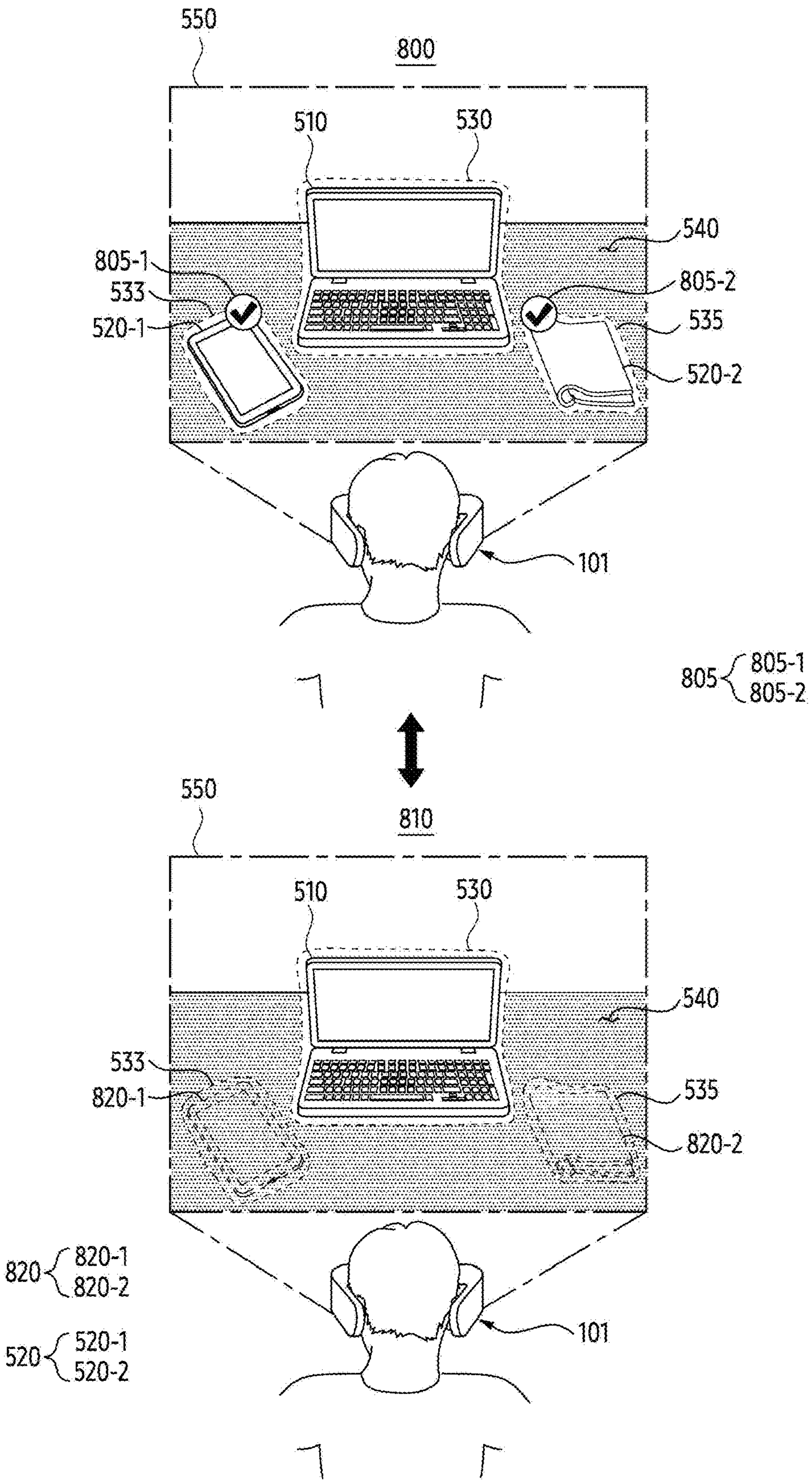
FIG. 8 illustrates an example of a visual object in which an electronic device according to an embodiment displays, by superimposing on at least one external object among a plurality of external objects.

FIG. 8 illustrates an example of a visual object in which an electronic device according to an embodiment displays, by superimposing on at least one external object among a plurality of external objects. An electronic device 101 may be an example of the electronic device 101 of FIG. 1 and/or the electronic device 101 of FIG. 2A. One or more external objects 510 and 520 may be referred to the one or more external objects 510 and 520 of FIG. 5. A state 800 may be referred to a state 500 of FIG. 5.

Referring to FIG. 8, in the state 800, the electronic device 101 according to an embodiment may identify an input indicating selecting at least a portion of the one or more external objects 510 and 520. For example, the electronic device 101 may use image data obtained in FIG. 6 in order to identify one or more external objects 510 and 520. For example, the input may include at least one of an input by eye tracking (ET), an input by hand tracking (HaT), or an input by a controller.

For example, the electronic device 101 may select the at least a portion of the one or more external objects 510 and 520 independently of identifying the input, based on data stored in a memory. The data may include information on a type of the one or more external objects 510 and 520. For example, the electronic device 101 may store the information on the type of the one or more external objects 510 and 520 for displaying the visual object, at least temporarily, by superimposing on the area, among areas in which the one or more external objects 510 and 520 are shown, through the display. However, it is not limited thereto.

For example, the electronic device 101 may identify at least one body part (e.g., eyes and/or pupils) of the user, by using a sensor (e.g., a sensor 470 of FIG. 4). For example, the electronic device 101 may identify the user's gaze based on the identified at least one body part. For example, the electronic device 101 may identify that the user's gaze matches a first external object 510. Based on identifying the matching, the electronic device 101 may display a visual object for temporarily covering external objects different from the first external object 510, by superimposing on the area in which the different external objects are shown.

For example, the electronic device 101 may display a visual object 805 corresponding to the input by superimposing on the second external objects 520 on the display. For example, in response to an input indicating selecting a third external object 520-1 from among the second external objects 520, the electronic device 101 may display a visual object 805-1 on the display, by superimposing on at least a portion of the third external object 520-1. For example, in response to an input indicating selecting a fourth external object 520-2 from among the second external objects 520, the electronic device 101 may display a visual object 805-2 by superimposing on at least a portion of the fourth external object 520-2.

For example, based on displaying the visual object 805, the electronic device 101 may obtain color information of an area (e.g., the area 540) having the largest size among areas 530, 533, 535, and 540. For example, the color information may be referred to color information of a desk 641 and/or an area 640 of FIG. 6. The electronic device 101 according to an embodiment may obtain a visual object 820, which corresponds to the areas 533 and 535 and includes the color information of the area 540, in a state 810, based on the obtained color information.

For example, based on obtaining the visual object 820, the electronic device 101 may display the visual object 820-1, by superimposing on the third external object 520-1, in the area 533, on the display. For example, based on obtaining the visual object 820, the electronic device 101 may display the visual object 820-2, by superimposing on the fourth external object 520-2, in the area 535, on the display. The electronic device 101 may provide the user with an environment capable of focusing on the first external object 510 by displaying a visual object 820 in response to the second external objects 520, respectively. For example, the electronic device 101 may display a visual guidance indicating the second area in which display is to be ceased, as linked with the second area, in response to the second input.

The electronic device 101 according to an embodiment may adjust a refresh rate of one or more pixels included in the display corresponding to the areas 533 and 535 while displaying the visual object 820. For example, the electronic device 101 may reduce the refresh rate the one or more pixels corresponding to the areas 533 and 535. The electronic device 101 may reduce power consumed by driving the electronic device 101 by reducing the refresh rate. The electronic device 101 may maintain the display of the visual object 820 for a long time based on reducing the consumed power.

The electronic device 101 according to an embodiment may identify an input for the areas 533 and 535 for a specified time. For example, the input may include one of the input by eye tracking (ET) and the input by hand tracking (HaT). However, it is not limited thereto. For example, the electronic device 101 may temporarily cease displaying a visual object (e.g., the visual object 820-1) displayed in one area (e.g., the area 533) among the areas 533 and 535 in response to the input. For example, the electronic device 101 may temporarily cease displaying the visual object (e.g., the visual object 820-1) so that the third external object 520-1 appears, in an area 533 for the specified time. By temporarily ceasing the display of the visual object, the user of the electronic device 101 may identify the third external object 520-1 for the specified time.

According to an embodiment, the electronic device 101 may identify a specified operation for switching from the state 810 to the state 800. Based on the identified specified action, the electronic device 101 may temporarily cease displaying the visual object 820. For example, the second external objects 520 may appear on the areas 533 and 535 respectively based on temporarily ceasing the display of the visual object 820.

As described above, the electronic device 101 may identify an input indicating selecting one external object among external objects adjacent to the electronic device 101. In response to the identified input, the electronic device 101 may temporarily display a visual object for covering the area on the area where the one external object is visible to the user through the display. The electronic device 101 may mask the one external object in the display, by superimposing and displaying the visual object. Based on the masking, the electronic device 101 may provide, to the user, an augmented reality that may be focused on an external object different from the one external object among the external objects.

Figure 9:
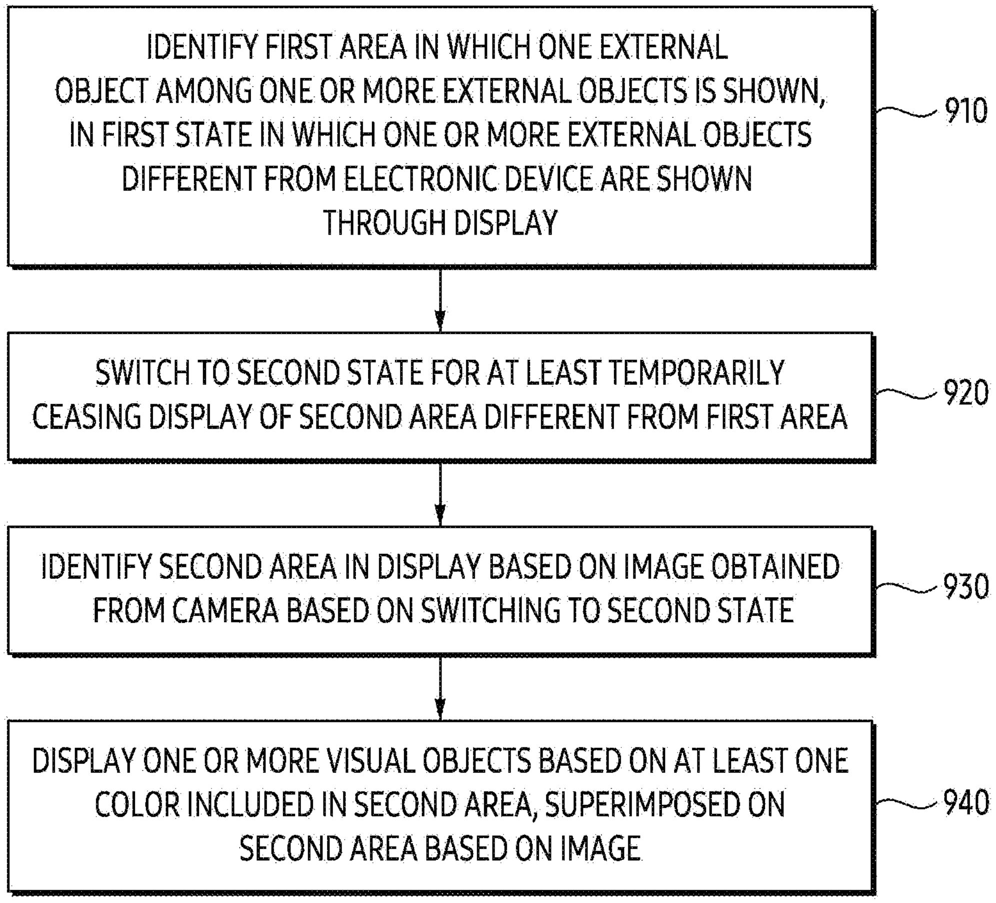
FIG. 9 illustrates an example of a flowchart for describing an operation of an electronic device according to an embodiment.

FIG. 9 illustrates an example of a flowchart for describing an operation of an electronic device according to an embodiment. The electronic device of FIG. 9 may include an electronic device 101 of FIGS. 1 to 8. At least one of the operations of FIG. 9 may be performed by the electronic device 101 of FIG. 4 and/or a processor 120 of FIG. 4.

Referring to FIG. 9, in operation 910, a processor according to an embodiment may identify a first area in which one external object among the one or more external objects is shown, in a first state in which one or more external objects different from the electronic device are shown through the display. The processor may obtain distance information on one or more external objects from the obtained image by using a camera (e.g., a camera 440 of FIG. 4) and/or a sensor (e.g., a sensor 470 of FIG. 4). The processor may obtain image data of FIG. 6 based on the obtained distance information. The processor may identify one or more external objects (e.g., one or more external objects 510 and 520 of FIG. 5) through a display (e.g., a display 450 of FIG. 4) in a state 500 of FIG. 5. The processor may identify areas (e.g., areas 530, 533, and 535 of FIG. 5) corresponding to each of the one or more external objects. The first area may be referred to an area 530 of FIG. 5. The one external object may be referred to a first external object 510 of FIG. 5. For example, the processor may display the areas that are visually highlighted with respect to another area being different from the areas, in response to a recognition (or, identification) of the areas.

Referring to FIG. 9, in operation 920, the processor according to an embodiment may switch to a second state for at least temporarily ceasing display of a second area different from the first area. For example, the second state may be referred to at least one of a state 700 of FIG. 7 and/or a state 810 of FIG. 8. The processor may switch from the first state to the second state by a user's input. The processor may switch from the first state to the second state based on identifying a specified condition (e.g., a specified time, and/or a specified place).

Referring to FIG. 9, in operation 930, the processor according to an embodiment may identify the second area in the display based on an image obtained from the camera based on switching to the second state. The image may be an example of an image obtained from the camera and corresponding to FoV 550 of FIG. 5. The camera may be referred to the camera 440 of FIG. 4. The display may be referred to the display 450 of FIG. 4. The second area may be referred to the area 740 of FIG. 7. The second area may include areas 533, 535, and 540 of FIG. 5.

Referring to FIG. 9, in operation 940, the processor according to an embodiment may display one or more visual objects based on at least one color included in the second area, superimposed on the second area based on the image. At least one color included in the second area may be an example of a color included in an area having the largest range among areas 530, 533, 535, and 540 of FIG. 5. The one or more visual objects may be displayed in the FoV (e.g., the FoV 550 of FIG. 5) by the electronic device based on an application executed by the processor and/or an input received from the user. The processor may provide a virtual environment for the first area to the user by displaying the one or more visual objects. Hereinafter, in FIG. 10, an operation for the electronic device 101 to control an external object different from the electronic device based on the communication circuit is described.

Figure 10:
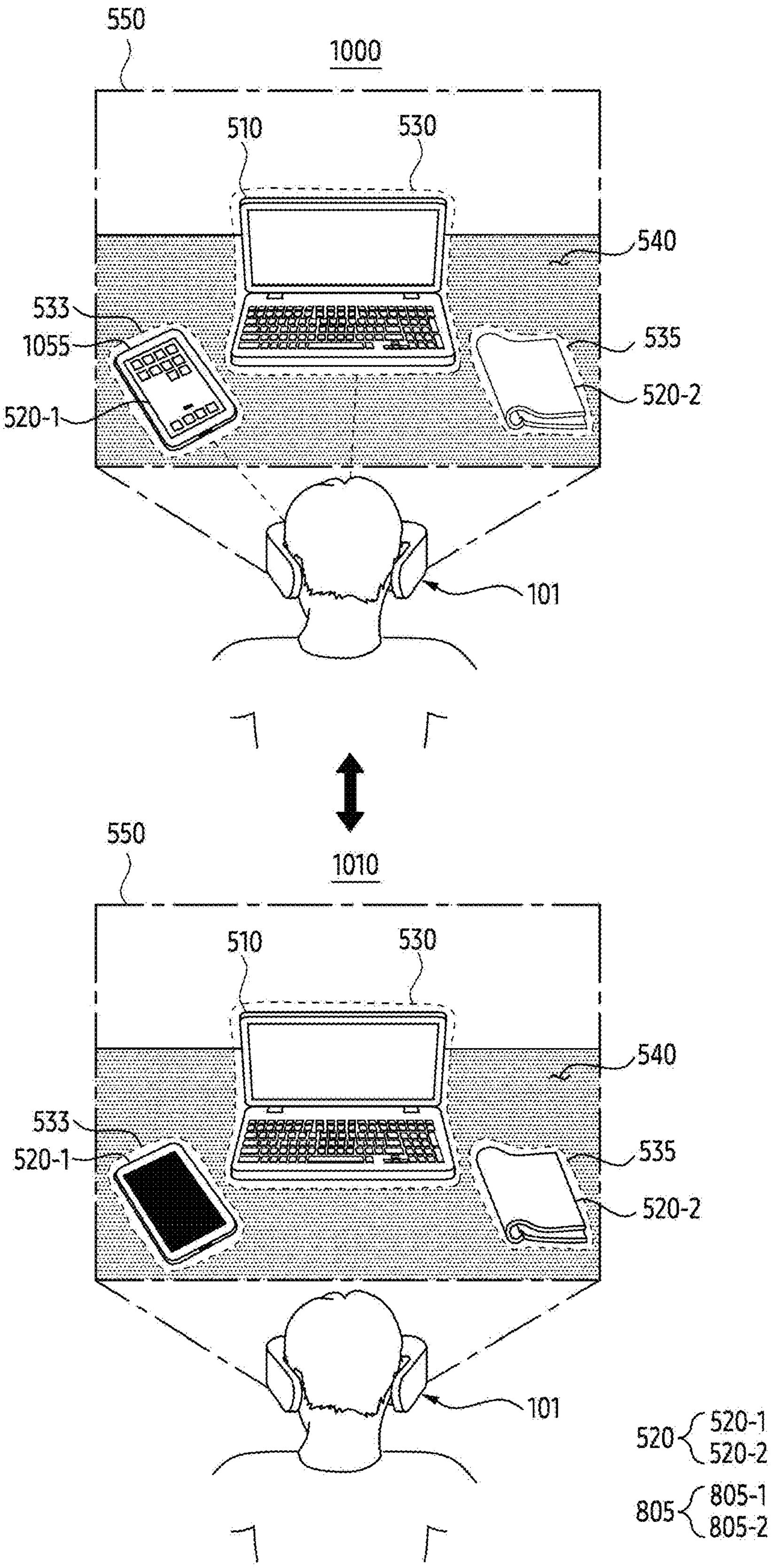
FIG. 10 illustrates an example of an operation in which an electronic device controls at least one external object among a plurality of external objects according to an embodiment.

FIG. 10 illustrates an example of an operation in which an electronic device controls at least one external object among a plurality of external objects according to an embodiment. An electronic device 101 of FIG. 10 may be referred to the electronic device 101 of FIG. 1 and/or the electronic device 101 of FIG. 2A. One or more external objects 510 and 520 may be referred to one or more external objects 510 and 520 of FIG. 5. A state 1000 may be referred to a state 500 of FIG. 5. A state 1010 may at least partially correspond to one of a state 700 of FIG. 7 and/or a state 810 of FIG. 8. A display 1055 may be referred to a display 455 of FIG. 4.

The electronic device 101 according to an embodiment may identify the one or more external objects 510 and 520 in FoV 550 in the state 1000. At least one of the one or more external objects 510 and 520 may include a communication circuit (e.g., a communication circuit 465 of FIG. 4). The electronic device 101 may establish a communication link, by using the third external object 520-1 and the communication circuit (e.g., a communication circuit 460 of FIG. 4). For example, the electronic device 101 may transmit a signal for at least partially controlling the third external object 520-1 based on the established communication link.

The electronic device 101 according to an embodiment may identify the third external object 520-1 among the one or more external objects 510 and 520 in an image (e.g., an image corresponding to the FoV 550) obtained from a camera, while establishing the communication link with the third external object 520-1. Based on identifying the third external object 520-1, the electronic device 101 may transmit a signal for at least partially controlling the display 1055 of the third external object 520-1 by using the established communication link. For example, the electronic device 101 may identify at least one screen displayed on the display 1055 of the third external object 520-1 in the image. For example, in the state 1010, the electronic device 101 may transmit a signal for temporarily ceasing the display of the at least one screen to the third external object 520-1 based on the communication link established with the third external object 520-1.

For example, the third external object 520-1 may at least temporarily inactivate the display 1055 of the third external object 520-1 based on the received signal. For example, the third external object 520-1 may temporarily cease displaying the at least one screen based on the received signal.

For example, in the state 1010, the electronic device 101 may display a visual object having a size corresponding to the display 1055 on the display (e.g., a display 450 of FIG. 4) of the electronic device 101 by superimposing on the area where the display 1055 is shown, independently of establishing the communication link with the third external object 520-1. For example, the visual object may include color information (e.g., black).

In the state 1010, the electronic device 101 according to an embodiment may receive a notification message generated by at least one of applications stored in the third external object 520-1 from the third external object 520-1 based on the communication link established with the third external object 520-1. For example, the electronic device 101 may transmit a signal for temporarily limiting the display of the received notification message to the third external object 520-1. For example, based on receiving the signal, the third external object 520-1 may temporarily refrain from displaying a screen based on the notification message.

The electronic device 101 according to an embodiment may identify a notification message set by the third external object 520-1 based on the communication link established with the third external object 520-1. The notification message may be an example of a notification message in which a user allows display of the notification. The electronic device 101 may request the third external object 520-1 to display the notification message in the display 1055 based on identifying the notification message based on the established communication link. However, it is not limited to the above-described embodiment.

As described above, the electronic device 101 may establish a communication link with one external object (e.g., the third external object 520-1) among one or more external objects adjacent to the electronic device 101. Based on the established communication link, the electronic device 101 may at least partially control the one external object. For example, the electronic device 101 may transmit a signal for at least temporarily ceasing the display of at least one screen by the display of the one external object to the one external object. The electronic device 101 may provide the user with virtual reality capable of focusing on an external object (e.g., a first external object 510) different from the one external object among the one or more external objects, by at least partially controlling one external object.

Figure 11:
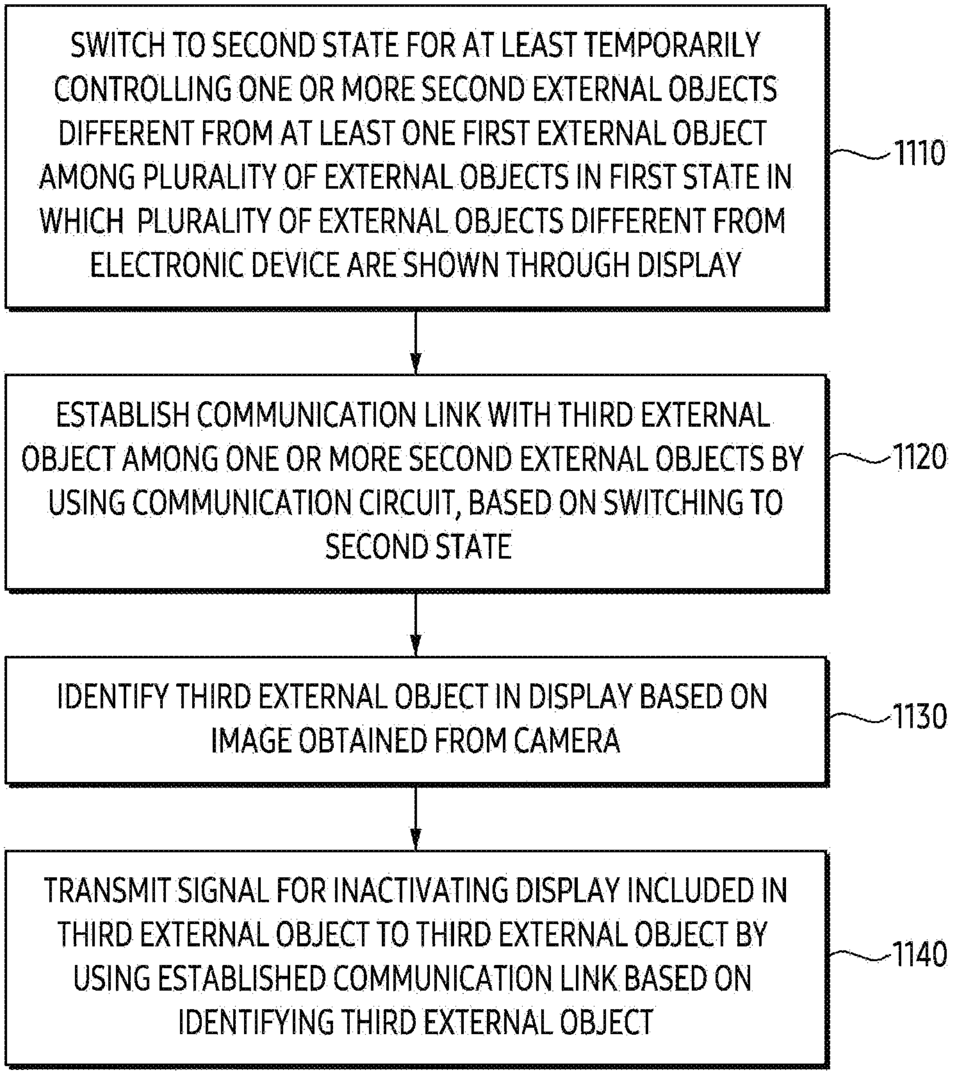
FIG. 11 illustrates an example of a flowchart for describing an operation of an electronic device according to an embodiment.

FIG. 11 illustrates an example of a flowchart for describing an operation of an electronic device according to an embodiment. The electronic device of FIG. 11 may include an electronic device 101 of FIGS. 1 to 10. At least one of the operations of FIG. 11 may be performed by the electronic device 101 of FIG. 4 and/or a processor 120 of FIG. 4.

Referring to FIG. 11, in operation 1110, the processor according to an embodiment may switch to a second state for at least temporarily controlling one or more second external objects different from at least one first external object among the plurality of external objects in a first state in which a plurality of external objects different from the electronic device are shown through the display. At least a portion of the operation 1110 may be associated with at least a portion of operation 910 of FIG. 9. The first state may be referred to a state 1000 of FIG. 10. The second state may be referred to a state 1010 of FIG. 10. For example, the processor may switch to the second state in response to an input indicating switching from the first state to the second state. For example, the processor may switch to the second state based on identifying the specified condition.

Referring to FIG. 11, in operation 1120, the processor according to an embodiment may establish a communication link with a third external object among the one or more second external objects by using a communication circuit, based on switching to the second state. For example, the third external object may include a personal computer (PC) such as a laptop or desktop, a smartphone, a smartpad, and/or a tablet PC. For example, the processor may establish the communication link with a communication circuit (e.g., a communication circuit 465 of FIG. 4) of the third external object (e.g., a third external object 520-1 of FIG. 10) by using the communication circuit (e.g., a communication circuit 460 of FIG. 4). Based on the established communication link, the processor may transmit and/or receive a signal for controlling at least a portion of the operations driven by the third external object.

Referring to FIG. 11, in operation 1130, the processor according to an embodiment may identify the third external object in the display based on an image obtained from a camera. The image obtained from the camera (e.g., a camera 440 of FIG. 4) may be an example of an image based on a FoV (e.g., a FoV 550 of FIG. 5). The image may include one or more external objects (e.g., one or more external objects 510 and 520 of FIG. 5). The processor may identify the third external object from among the one or more external objects, based on image data of FIG. 6, for example. For example, in the second state, the processor may store information of the one or more external objects for controlling at least temporarily in a memory. Based on the information, the processor may identify the third external object.

For example, in the second state, the processor may receive an input indicating selecting at least a portion of one or more external objects for controlling at least temporarily. the processor may identify, a third external object, based on the received input Referring to FIG. 11, in operation 1140, the processor according to an embodiment may transmit a signal for inactivating the display (e.g., a display 1055 of FIG. 10) included in the third external object to the third external object by using the established communication link based on identifying the third external object. For example, the third external object may temporarily cease displaying at least one screen displayed in the display based on receiving the signal.

For example, the processor may request the third external object to temporarily cease display of a notification message generated by at least one application stored in the third external object in a display included in the third external object. However, it is not limited to the above-described embodiment.

For example, the processor may display a visual object corresponding to a size of a second display (e.g., the display 1055 of FIG. 10) included in the third external object in a first display (e.g., a display 450 of FIG. 4) of the electronic device 101, independently of transmitting the signal, in an area of the second display shown to the user through the first display. By displaying the visual object, the processor may temporarily cease the notification message from being shown, by the user of the electronic device.

Figure 12:
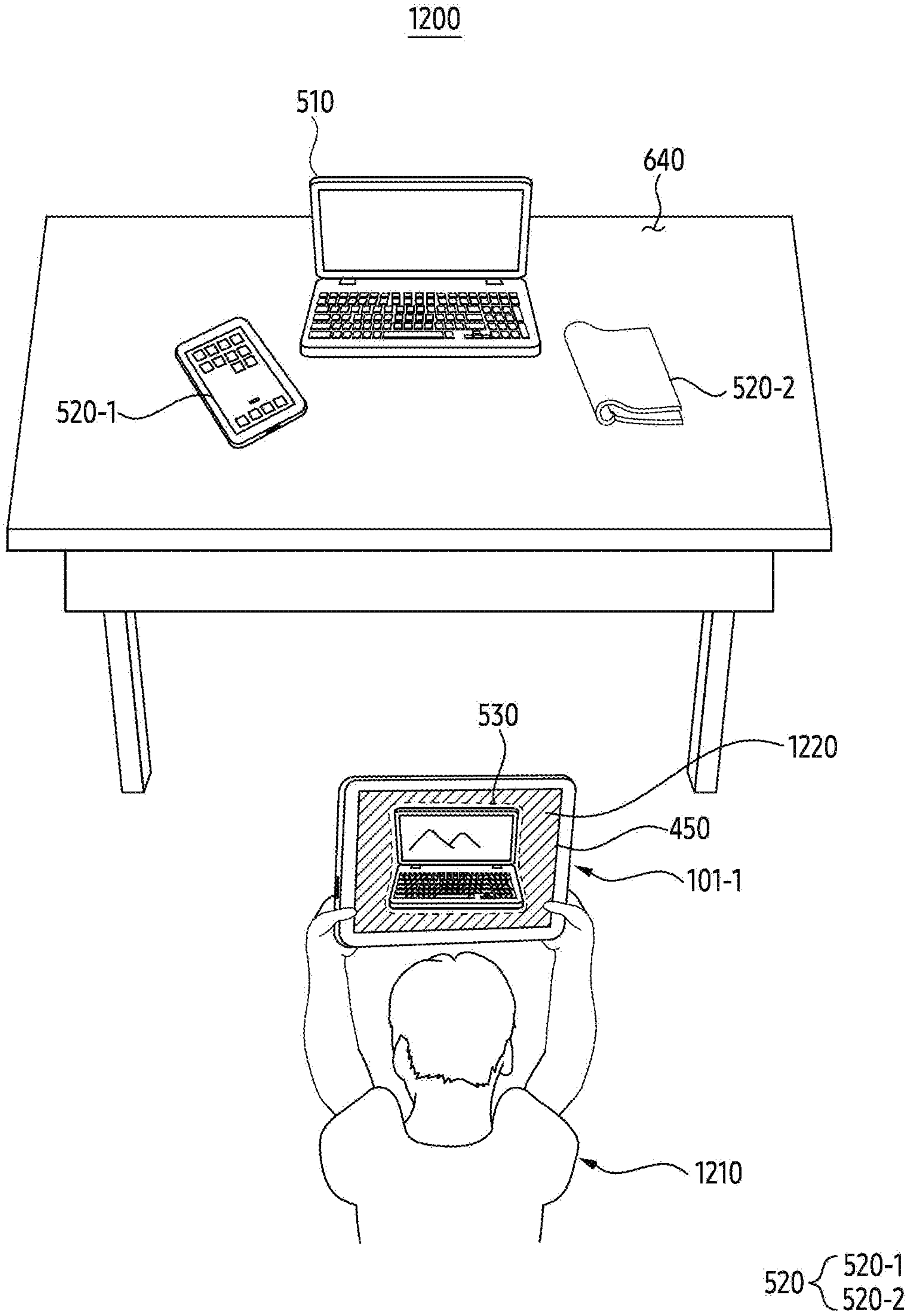
FIG. 12 illustrates an exemplary state in which an electronic device according to an embodiment provides a user with a screen reconstructed from an image obtained through a camera.

FIG. 12 illustrates an exemplary state in which an electronic device according to an embodiment provides a user with a screen reconstructed from an image obtained through a camera. An electronic device 101-1 of FIG. 12 may be an example of an electronic device 101 of FIGS. 1 to 10. For example, at least one of the embodiments described above in FIGS. 1 to 11 may be implemented by the electronic device 101-1 of FIG. 12. The electronic device 101-1 of FIG. 12 may correspond to a smartphone and/or a smartpad. The electronic device 101-1 of FIG. 12 may provide augmented reality (e.g., concentration mode) to a user 1210. For example, although not illustrated, the electronic device 101-1 may implement at least one of the embodiments described above in FIGS. 1 to 11 as it is worn on at least a portion of the body part of the user 1210 based on coupling with at least one external device. However, it is not limited thereto.

Referring to FIG. 12, in state 1200, the electronic device 101-1 may obtain an image including one or more external objects 510 and 520 from the camera (e.g., a camera 440 of FIG. 4) and/or a sensor (e.g., a sensor 470 of FIG. 4). The electronic device 101 according to an embodiment may control one or more pixels included in the display 450 based on obtaining the image. For example, the image may include the one or more external objects 510 and 520.

For example, the electronic device 101-1 may display a visual object, superimposed on at least a partial area of the image. For example, the partial area may be an area in the display 450 excluding a area 530 for displaying a first external object 510. For example, a state in which the electronic device 101-1 superimposes and displays the visual object on the partial area may be referred to at least a portion of a state 700 of FIG. 7. For example, the partial area may include an area where a second external objects 520 are shown to the user. For example, the electronic device 101 may obtain color information to which the largest portion is assigned in the image by using image data of FIG. 6 obtained through the camera and/or the sensor. The electronic device 101-1 may generate the visual object based on the obtained color information. For example, the electronic device 101 may change the color information of the visual object. For example, the visual object may be referred to a visual object displayed in an area 740 of FIG. 7.

The electronic device 101-1 according to an embodiment may adjust an alpha value of the visual object. The alpha value may mean the opacity of the visual object displayed in the display 450. For example, by adjusting the alpha value, at least a portion of the second external objects 520 may be displayed, superimposed on the visual object, in the display 450.

The electronic device 101-1 according to an embodiment may establish a communication link with at least a portion of one or more external objects by using a communication circuit. The electronic device 101-1 may control the at least a portion based on the established communication link. For example, the electronic device 101-1 may establish a communication link with the third external object 520-1. Based on the established communication link, the electronic device 101-1 may temporarily cease displaying at least one screen in the display (e.g., a display 1055 of FIG. 10) of the third external object 520-1. However, it is not limited to the above-described embodiment.

As described above, the electronic device 101-1 may provide an augmented reality service (e.g., concentration mode) to the user, by displaying the image 1220 including the first external object 510 and the visual object in the display 450. A user using the augmented reality service may clearly identify the first external object 510 included in the image 1220 rather than identifying the first external object 510, among the first external object 510 and the second external objects 520 included in an image different from the image 1220.

The electronic device according to an embodiment may provide a user with the augmented reality service capable of focusing on at least one of one or more external objects in an image obtained through the camera and/or the sensor. In order to provide the augmented reality service, a method for controlling display for at least a portion of the one or more external objects on a display is required.

As described above, an electronic device according to an embodiment may comprise a camera, a display, and at least one processor. The at least one processor may be configured to, in a first state, identify a first area in which an external object among one or more external objects is shown, the first state being a state in which the one or more external objects are displayed, wherein the one or more external objects are different from the electronic device. The at least one processor may be configured to change to a second state the second state being a state in which a second area different from the first area is not displayed for a first time. The at least one processor may be configured to identify the second area in the display based on an image obtained from the camera based on changing to the second state. The at least one processor may be configured to display one or more visual objects superimposed on the second area, based on at least one color included in the second area.

For example, the external object includes a first external object. The at least one processor may be configured to identify one or more second external objects, in the second area, in the second state. The at least one processor may be configured to identify one or more portions in which each of the one or more second external objects is shown. The at least one processor may be configured to display the one or more visual objects, respectively, superimposed on the identified one or more portions.

For example, the at least one processor may be configured to change from the first state to the second state, in response to a first input indicating a change to the second state in the first state.

For example, the one or more portions may be configured to include first portions. The at least one processor, in the second state, in response to a second input indicating that one or more third external objects included in the one or more second external objects are selected, may be configured to display the one or more visual objects, superimposed on second portions in which the one or more third external objects are shown.

For example, the electronic device may be configured to further comprise one or more sensors 410. The at least one processor may be configured to identify at least one body part using a first sensor of the one or more sensors. The at least one processor may be configured to receive the second input based on the identified body part.

For example, the image includes a first image. The at least one processor may be configured to obtain distance information between the electronic device and the one or more external objects, through a second sensor different from the first sensor. The at least one processor may be configured to obtain a second image different from the first image, based on the obtained distance information. The at least one processor may be configured to identify each of the one or more second external objects based on the obtained second image.

For example, the at least one processor may be configured to identify a specified action based on a third sensor. The at least one processor may be configured to change from the second state to the first state, based on identifying the specified action.

For example, the at least one processor may be configured to identify a third input for the second area using the first sensor. For example, the at least one processor may be configured to temporality cease display of the one or more visual objects, based on identifying the third input.

For example, the at least one processor may be configured to adjust refresh rate of one or more pixels included in the display corresponding to the second area, during displaying the one or more visual objects.

For example, the at least one processor may be configured to adjust a size of the first area, in the second state.

As described above, a method of an electronic device according to an embodiment, may changing from a first state to a second state for controlling one or more second external objects for a first time, the first state being one in which a plurality of external objects different from the electronic device are displayed, and the one or more second external objects being different from at least one first object among the plurality of external objects. The method may comprise establishing a communication link with a third external object among the one or more second external objects using a communication circuit, based on changing to the second state. The method may comprise identifying the third external object in the display based on an image obtained from a camera. The method may comprise transmitting, to the third external object, a signal for deactivating a display included in the third external object, using the established communication link based on identifying the third external object.

For example, the method may comprise identifying at least one body part using a first sensor among one or more sensors. For example, the method may comprise receiving a first input based on the identified the at least one body part. For example, the method may comprise changing from the first state to the second state, in response to the received first input.

For example, the method may comprise transmitting the signal for deactivating the display included in the third external object, in response to a second input indicating that the third external object is selected in the image using the first sensor.

For example, the method may comprise obtaining distance information between the electronic device and the one or more second external objects, using a second sensor different from the first sensor.

For example, the image may include a first image. The method may comprise obtaining a second image different from the first image based on the obtained distance information. The method may comprise identifying the third external object, based on the obtained second image.

As described above, an electronic device according to an embodiment may comprise a camera, a display, a communication circuit, and at least one processor. The at least one processor may be configured to change from a first state to a second state for controlling one or more second external objects for a first time, the first state being one in which a plurality of external objects different from the electronic device are displayed, and the one or more second external objects being different from at least one first object among the plurality of external objects. The at least one processor may be configured to establish a communication link with a third external object among the one or more second external objects using the communication circuit, based on changing to the second state. The at least one processor may be configured to identify the third external object in the display based on an image obtained from the camera. The at least one processor may be configured to transmit, to the third external object, a signal for inactivating a display included in the third external object, using the established communication link based on identifying the third external object.

For example, the electronic device may be configured to further comprise one or more sensors 470. The at least one processor may be configured to identify at least one body part using a first sensor among the one or more sensors. The at least one processor may be configured to receive a first input based on the identified the at least one body part. The at least one processor may be configured to change from the first state to the second state, based on the received first input.

For example, the at least one processor may be configured to transmit the signal for deactivating the display included in the third external object, in response to a second input indicating that the third external object is selected in the image using the first sensor.

For example, the at least one processor may be configured to obtain distance information between the electronic device and the one or more second external objects, using a second sensor different from the first sensor.

For example, the image includes a first image. The at least one processor may be configured to obtain a second image different from the first image based on the obtained distance information. The at least one processor may be configured to identify the third external object, based on the obtained second image.

As described above, a method of an electronic device according to an embodiment may comprise, in a first state, identifying a first area in which an external object among one or more external objects is shown, the first state being a state in which the one or more external objects are displayed, wherein the one or more external objects are different from the electronic device. The method may comprise changing to a second state the second state being a state in which a second area different from the first area is not displayed for a first time. The method may comprise identifying the second area in the display based on an image obtained from the camera based on changing to the second state. The method may comprise displaying one or more visual objects superimposed on the second area, based on at least one color included in the second area.

For example, the external object includes a first external object. The method may comprise identifying one or more second objects in the second state. The method may comprise identifying one or more portions in which each of the second external objects is shown. The method may comprise displaying the one or more visual objects, respectively, superimposed on the identified one or more portions.

For example, the method may comprise changing from the first state to the second state, in response to a first input indicating a change to the second state in the first state.

For example, the one or more portions may include first portions. The method, in the second state, in response to a second input indicating that one or more third external objects included in the identified second external objects are selected, may comprise displaying the one or more visual objects, superimposed on second portions in which the one or more third external objects are shown.

For example, the electronic device may further comprise one or more sensors. The method may comprise identifying at least one body part using a first sensor of the one or more sensors. The method may comprise receiving the second input based on the identified body part.

For example, the method may comprise obtaining distance information between the electronic device and the one or more external objects, through a second sensor different from the first sensor.

For example, the image includes a first image. The method may comprise obtaining a second image different from the first image, based on the obtained distance information. The method may comprise identifying each of the one or more second external objects based on the obtained second image.

For example, the method may comprise identifying a specified action based on a third sensor. The method may comprise changing from the second state to the first state, based on identifying the specified action.

For example, the method may comprise identifying a third input for the second area using the first sensor. The method may comprise temporality ceasing display of the one or more visual objects, based on identifying the third input.

For example, the method may comprise adjusting refresh rate of one or more pixels included in the display corresponding to the second area during displaying the one or more visual objects.

For example, the method may comprise adjusting a size of the first area, in the second state.

As described above, an electronic device according to an embodiment may comprise a camera, a display, a memory configured to store instructions, and at least one processor. The at least one processor may be configured to, when the instructions are executed, cause the electronic device to receive a first input for enabling a designated setting. The at least one processor may be configured to, when the instructions are executed, cause the electronic device to, in response to the input, recognize, from a screen being displayed through the display, a first area occupied by a first external object and a second area occupied by a second external object, based on an image being obtained via the camera. The at least one processor may be configured to, when the instructions are executed, cause the electronic device to receive a second input on the first area from among the first area and the second area, after the first area and the second area are recognized from the screen according to the designated setting. The at least one processor may be configured to, when the instructions are executed, cause the electronic device to, in response to the second input, maintain to display the first area in the screen, and cease to display the second area in the screen by displaying a visual object superimposed on the second area, wherein the visual object has color of a portion of the screen adjacent to the second area.

For example, wherein the at least one processor may be configured to, when the instructions are executed, cause the electronic device to in response to the recognition of the first area and the second area, display the first area and the second area that are visually highlighted with respect to a third area of the screen being different from the first area and the second area, wherein the at least one processor may be configured to, when the instructions are executed, cause the electronic device to receive the second input, while the first area and the second area that are visually highlighted are displayed.

For example, wherein the second input is an input indicating to select the first area from among the first area and the second area.

For example, wherein the second input is an input indicating to select the second area from among the first area and the second area.

For example, wherein the at least one processor may be configured to, when the instructions are executed, cause the electronic device to, in response to the second input, display a visual guidance indicating the second area in which display is to be ceased, as linked with the second area.

For example, wherein the at least one processor may be configured to, when the instructions are executed, cause the electronic device to, in response to the second input, further display a visual affordance representing that the second external object is covered by the visual object and enable a timer for the designated setting, wherein the at least one processor may be configured to, when the instructions are executed, cause the electronic device to, in response to expiration of the timer, cease to display the visual affordance.

As described above, according to an embodiment, a method of an electronic device comprising a camera, a display, a memory configured to store instructions, and at least one processor, the method may comprise receiving a first input for enabling a designated setting. The method may comprise in response to the input, recognizing, from a screen being displayed through the display, a first area occupied by a first external object and a second area occupied by a second external object, based on an image being obtained via the camera. The method may comprise receiving a second input on the first area from among the first area and the second area, after the first area and the second area are recognized from the screen according to the designated setting. The method may comprise, in response to the second input, maintaining to display the first area in the screen, and ceasing to display the second area in the screen by displaying a visual object superimposed on the second area, wherein the visual object has color of a portion of the screen adjacent to the second area.

As described above, according to an embodiment, a method of an electronic device comprising a camera, a display, a memory configured to store instructions and at least one processor, may comprise, in a first state in which one or more external objects different from the electronic device are shown through the display, identifying a first area in which an external object among one or more external objects is shown. A method may comprise changing to a second state to cease at least temporarily display of a second area different from the first area. A method may comprise identifying the second area in the display based on an image obtained from the camera, and displaying one or more visual objects based on at least one color included in the second area, superimposed on the second area, based on the image, for changing to the second state.

As described above, an electronic device according to an embodiment may comprise a camera, a display, a memory configured to store instructions, and at least one processor. The at least one processor may be configured to, when the instructions are executed, cause the electronic device to, in a first state in which one or more external objects different from the electronic device are shown through the display, identify a first area in which an external object among one or more external objects is shown. The at least one processor may be configured to, when the instructions are executed, cause the electronic device to change to a second state to cease at least temporarily display of a second area different from the first area. The at least one processor may be configured to, when the instructions are executed, cause the electronic device to identify the second area in the display based on an image obtained from the camera, and display one or more visual objects based on at least one color included in the second area, superimposed on the second area, based on the image, for changing to the second state.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. A head-wearable display device comprising:
at least one camera;
displays that are configured to be viewed as a screen by a user wearing the head-wearable display device;
at least one processor comprising processing circuitry; and
memory storing instructions,
wherein the instructions, when executed by the at least one processor individually or collectively, cause the head-wearable display device to:
display, through the displays, the screen comprising a first object and a background including an external object, the background corresponding to at least a portion of a field of view (FOV) of the at least one camera;
receive an input from the user;
based on the input and while maintaining the displaying of the first object on the screen, display a visual object corresponding to an imaginary image to cover the external object, wherein the visual object is displayed instead of the background, wherein the visual object is displayed on an entire area of the screen excluding the first object, and wherein the external object is invisible in accordance with the visual object being displayed;
determine whether a predetermined condition is satisfied while the visual object is displayed; and
in accordance with a determination that the predetermined condition is satisfied, display, on the screen, the external object on an area corresponding to the external object.

2. The head-wearable display device of claim 1,
wherein the first object comprises an enlarged version of a user interface of an external electronic device positioned in at least the portion of the FOV.

3. The head-wearable display device of claim 1, further comprising a button to receive the input from the user, wherein the input causes the displaying of the visual object instead of the background.

4. The head-wearable display device of claim 1,
wherein the predetermined condition includes identifying a movement input of the user,
wherein the movement input of the user includes at least one of a head tracking input of the user or an eye tracking input of the user,
wherein the instructions, when executed by the at least one processor individually or collectively, cause the head-wearable display device, to:
based on the predetermined condition being satisfied, display the external object by, ceasing to display a portion of the visual object on the area corresponding to the external object for a predetermined time.

5. The head-wearable display device of claim 1,
wherein the instructions, when executed by the at least one processor individually or collectively, cause the head-wearable display device, to:
based on determining that the external object in the background is gazed at by the user, reduce an opacity of a portion of the background corresponding to the external object.

6. The head-wearable display device of claim 1, wherein the instructions, when executed by the at least one processor individually or collectively, cause the head-wearable display device, to:
based on an outdoor ambient light obtained using the at least one camera, adjust an opacity of at least a portion of the visual object to display one object in the background area.

7. A method for operating a head-wearable device, the method being executed by at least one processor, the method comprising:
displaying, through displays that are configured to be viewed as a screen by a user wearing the head-wearable display device, a first object and a background including an external object, the background corresponding to at least a portion of a field of view (FOV) of at least one camera;
receiving an input from the user;
based on receiving the input and while maintaining the displaying of the first object on the screen, displaying a visual object corresponding to an imaginary image to cover the external object, wherein the visual object is displayed instead of the background, wherein the visual object is displayed on an entire area of the screen excluding the first object, and wherein the at least one object is invisible in accordance with the visual object being displayed;
determining whether a predetermined condition is satisfied while the visual object is displayed; and
in accordance with a determination that the predetermined condition is satisfied, displaying, on the screen, the external object on an area corresponding to the external object.

8. The method of claim 7, wherein the first object comprises an enlarged version of a user interface of an external electronic device positioned in at least the portion of the FOV.

9. The method of claim 7, wherein the input is received using a button.

10. The method of claim 7,
wherein the predetermined condition includes identifying a movement input of the user,
wherein the movement input of the user includes at least one of a head tracking input of the user or an eye tracking input of the user,
wherein the method further comprises:
based on the predetermined condition being satisfied, displaying the external object by ceasing to display a portion of the visual object on the area corresponding to the external object for a predetermined time.

11. The method of claim 7, wherein the method further comprises:
based on an outdoor ambient light obtained using the at least one camera, adjusting an opacity of at least a portion of the visual object to display one object in the background area.

12. The method of claim 7, wherein the method further comprises:
based on determining that the external object in the background is gazed at by the user, reducing an opacity of a portion of the background corresponding to the external object.

13. A head-wearable display device, comprising:

at least one camera;

displays that are configured to be viewed as a screen by a user wearing the head-wearable display device;

at least one processor comprising processing circuitry; and memory storing instructions, wherein the instructions, when executed by the at least one processor individually or collectively, cause the head-wearable display device, to:

display, through the displays, the screen comprising at least one first visual object and a background including an external object, the background corresponding to at least a portion of a field of view (FOV) of the at least one camera;

receive an input from the user;

based on receiving the input from the user and while maintaining the displaying of the at least one first visual object, display a second visual object, for covering the external object, instead of the background, wherein the second visual object is different than the at least one first visual object, and wherein the second visual object is an imaginary image different than the background, and wherein the second visual object is displayed on an entire area of the screen excluding the first object, and wherein the external object is invisible in accordance with the visual object being displayed;

determine whether a predetermined condition is satisfied while the visual object is displayed; and in accordance with a determination that the predetermined condition is satisfied, display, on the screen, the external object on an area corresponding to the external object.

14. The head-wearable display device of claim 13, wherein the at least one first visual object comprises an enlarged version of a user interface of an external electronic device positioned in at least the portion of the FOV.

* * * * *